(12) United States Patent
Nishikori

(10) Patent No.: US 11,881,355 B2
(45) Date of Patent: Jan. 23, 2024

(54) MULTILAYER CERAMIC CAPACITOR

(71) Applicant: Murata Manufacturing Co., Ltd., Nagaokakyo (JP)

(72) Inventor: Makoto Nishikori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 267 days.

(21) Appl. No.: 17/511,616

(22) Filed: Oct. 27, 2021

(65) Prior Publication Data
US 2022/0165496 A1    May 26, 2022

(30) Foreign Application Priority Data

Nov. 25, 2020    (JP) ................. 2020-195387

(51) Int. Cl.
*H01G 4/12*    (2006.01)
*H01G 4/30*    (2006.01)

(52) U.S. Cl.
CPC ............ *H01G 4/1209* (2013.01); *H01G 4/30* (2013.01)

(58) Field of Classification Search
CPC ...... H01G 4/30; H01G 4/1209; H01G 4/1218; H01G 4/005; H10G 4/008
USPC ............ 361/301.4, 303, 321.1, 321.2, 321.5
See application file for complete search history.

(56) References Cited

U.S. PATENT DOCUMENTS

| | | | |
|---|---|---|---|
| 2013/0094118 A1* | 4/2013 | Kim | H01G 4/30 361/301.4 |
| 2018/0261390 A1* | 9/2018 | Sakate | H01G 4/30 |
| 2018/0268999 A1* | 9/2018 | Shimada | H01G 4/232 |
| 2021/0012966 A1* | 1/2021 | Park | H01G 4/012 |
| 2021/0027947 A1* | 1/2021 | Kim | H01G 4/30 |

FOREIGN PATENT DOCUMENTS

| | | |
|---|---|---|
| JP | 04-010406 A | 1/1992 |
| JP | 08-138966 A | 5/1996 |
| JP | 08-306580 A | 11/1996 |
| JP | 2014-187217 A | 10/2014 |

* cited by examiner

*Primary Examiner* — Arun Ramaswamy
(74) *Attorney, Agent, or Firm* — Keating & Bennett, LLP

(57) ABSTRACT

A multilayer ceramic capacitor includes a first internal electrode, a second internal electrode, a first dielectric layer, and a second dielectric layer. The first internal electrode includes a first outer peripheral portion and a first inner electrode portion inside the first outer peripheral portion. The second internal electrode includes a second outer peripheral portion and a second inner electrode portion inside the second outer peripheral portion. The first dielectric layer includes a first high dielectric constant portion, and a first inner dielectric layer portion inside the first high dielectric constant portion. The second dielectric layer include a second high dielectric constant portion and a second inner dielectric layer portion inside the second high dielectric constant portion.

19 Claims, 12 Drawing Sheets

MULTILAYER CERAMIC CAPACITOR

CROSS REFERENCE TO RELATED APPLICATIONS

This application claims the benefit of priority to Japanese Patent Application No. 2020-195387 filed on Nov. 25, 2020. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known. In general, a multilayer ceramic capacitor includes a ceramic sintered body made of a dielectric ceramic such as barium titanate. Inside the ceramic sintered body, a plurality of internal electrodes are laminated with ceramic layers interposed therebetween. Furthermore, external electrodes are respectively provided on one end surface and on the other end surface of this ceramic sintered body such that the external electrodes are respectively connected to the internal electrodes (for example, refer to Japanese Unexamined Patent Application, Publication No. H08-306580).

Recently, with the miniaturization and densification of electronic devices, miniaturization, increased capacitance, and improvement in reliability of the multilayer ceramic capacitor have been required. For this reason, making the dielectric layers thinner and increasing the number of laminated dielectric layers, and making the internal electrodes thinner have been attempted. However, when the internal electrodes are thinned, voids are likely to be generated in the internal electrodes after firing. When voids are generated in the internal electrodes, the area of the internal electrodes varies. Therefore, a problem occurs in that the capacitance decreases due to a decrease in the active area contributing to the generation of the capacitance. As a solution to the above problem, for example, one possible way is to increase the capacitance by increasing the relative dielectric constant in all of the dielectric layers of the multilayer ceramic capacitor. However, when increasing the relative dielectric constant in all of the dielectric layers of the multilayer ceramic capacitor, there is a problem in that the reliability of the multilayer ceramic capacitor is lowered.

SUMMARY OF THE INVENTION

Preferred embodiments of the present invention provide multilayer ceramic capacitors that each make it possible to maintain a high capacitance and ensure high reliability.

A preferred embodiment of the present invention provides a multilayer ceramic capacitor that includes a multilayer body including a plurality of laminated dielectric layers and a plurality of laminated internal electrodes, the multilayer body further including a first main surface and a second main surface that are opposed to each other in a height direction, a first side surface and a second side surface that are opposed to each other in a width direction perpendicular or substantially perpendicular to the height direction, and a first end surface and a second end surface that are opposed to each other in a length direction perpendicular or substantially perpendicular to the height direction and the width direction, and external electrodes, wherein the plurality of laminated dielectric layers each include a first dielectric layer and a second dielectric layer, the plurality of laminated internal electrodes each include a first internal electrode on the first dielectric layer and extending to the first end surface, and a second internal electrode on the second dielectric layer and extending to the second end surface, the external electrodes include a first external electrode connected to the first internal electrode and on the first end surface, and a second external electrode connected to the second internal electrode and on the second end surface, the first internal electrode includes four sides, and further includes a first outer peripheral portion in a vicinity of three sides other than one side extending to the first end surface, and a first inner electrode portion inside the first outer peripheral portion, the second internal electrode includes four sides, and further includes a second outer peripheral portion in a vicinity of three sides other than one side extending to the second end surface, and a second inner electrode portion inside the second outer peripheral portion, when a coverage of the first internal electrode relative to the first dielectric layer in the first outer peripheral portion is defined as A1, and a coverage of the first internal electrode relative to the first dielectric layer in the first inner electrode portion is defined as B1, a relationship of A1<B1 is satisfied, when a coverage of the second internal electrode relative to the second dielectric layer in the second outer peripheral portion is defined as A2, and a coverage of the second internal electrode relative to the second dielectric layer in the second inner electrode portion is defined as B2, a relationship of A2<B2 is satisfied, the first dielectric layer includes four sides in a region in which the first internal electrode is provided, and further includes a first high dielectric constant portion in a vicinity of three sides other than one side located at the first end surface, and a first inner dielectric layer portion located inside the first high dielectric constant portion, the second dielectric layer includes four sides in a region in which the second internal electrode is provided, and further includes a second high dielectric constant portion in a vicinity of three sides other than one side located at the second end surface, and a second inner dielectric layer portion located inside the second high dielectric constant portion, when a relative dielectric constant of the first dielectric layer in the first high dielectric constant portion is defined as A3, and a relative dielectric constant of the first dielectric layer in the first inner dielectric layer portion is defined as B3, a relationship of A3>B3 is satisfied, when a relative dielectric constant of the second dielectric layer in the second high dielectric constant portion is defined as A4, and a relative dielectric constant of the second dielectric layer in the second inner dielectric layer portion is defined as B4, a relationship of A4>B4 is satisfied, and a covering ratio of the first high dielectric constant portion relative to the first outer peripheral portion, and a covering ratio of the second high dielectric constant portion relative to the second outer peripheral portion are about 68% or more and about 187% or less.

According to preferred embodiments of the present invention, it is possible to provide multilayer ceramic capacitors that each make it possible to maintain a high capacitance and ensure high reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
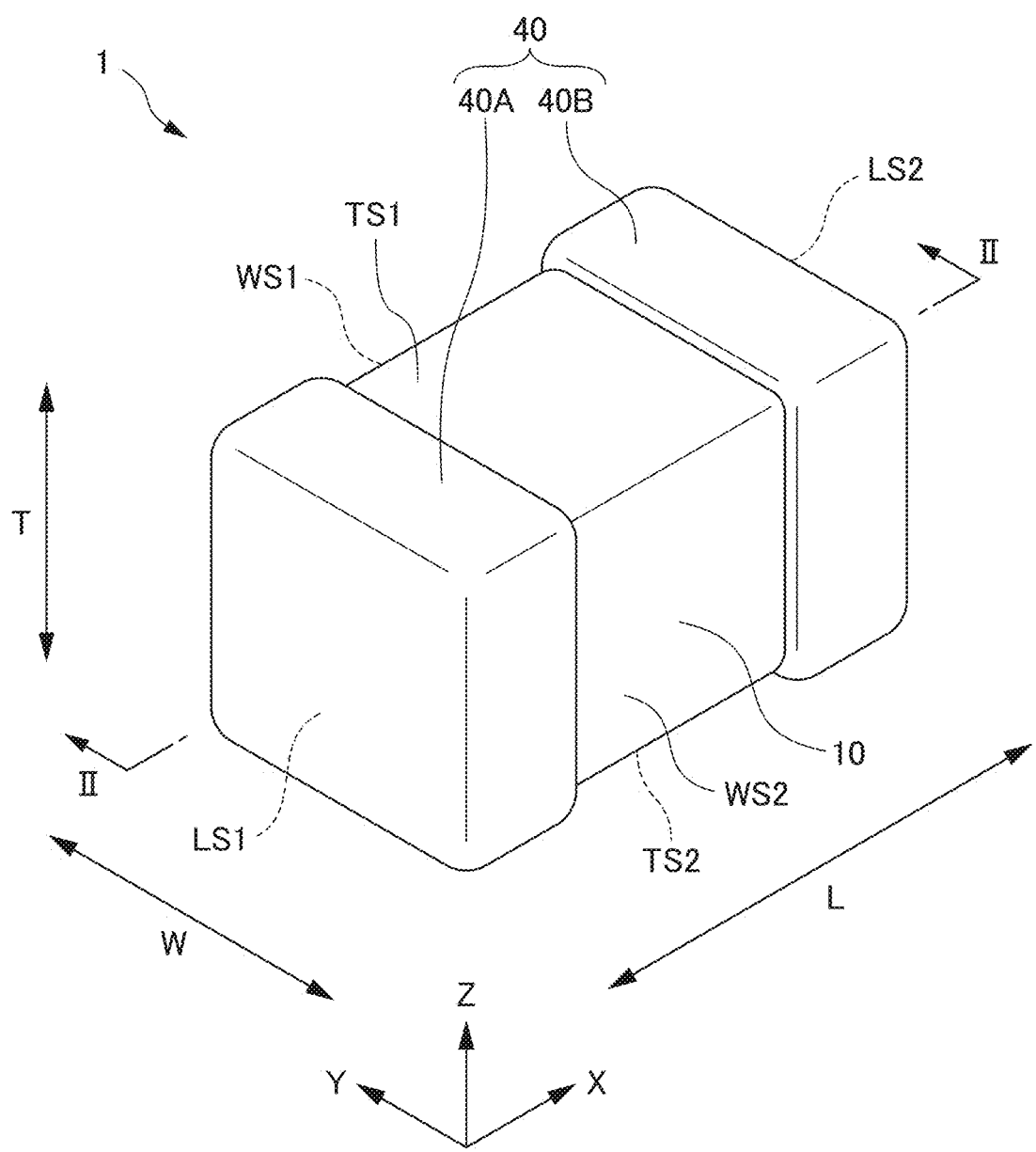
FIG. 1 is an external perspective view of a multilayer ceramic capacitor of a preferred embodiment of the present invention.
Figure 2:
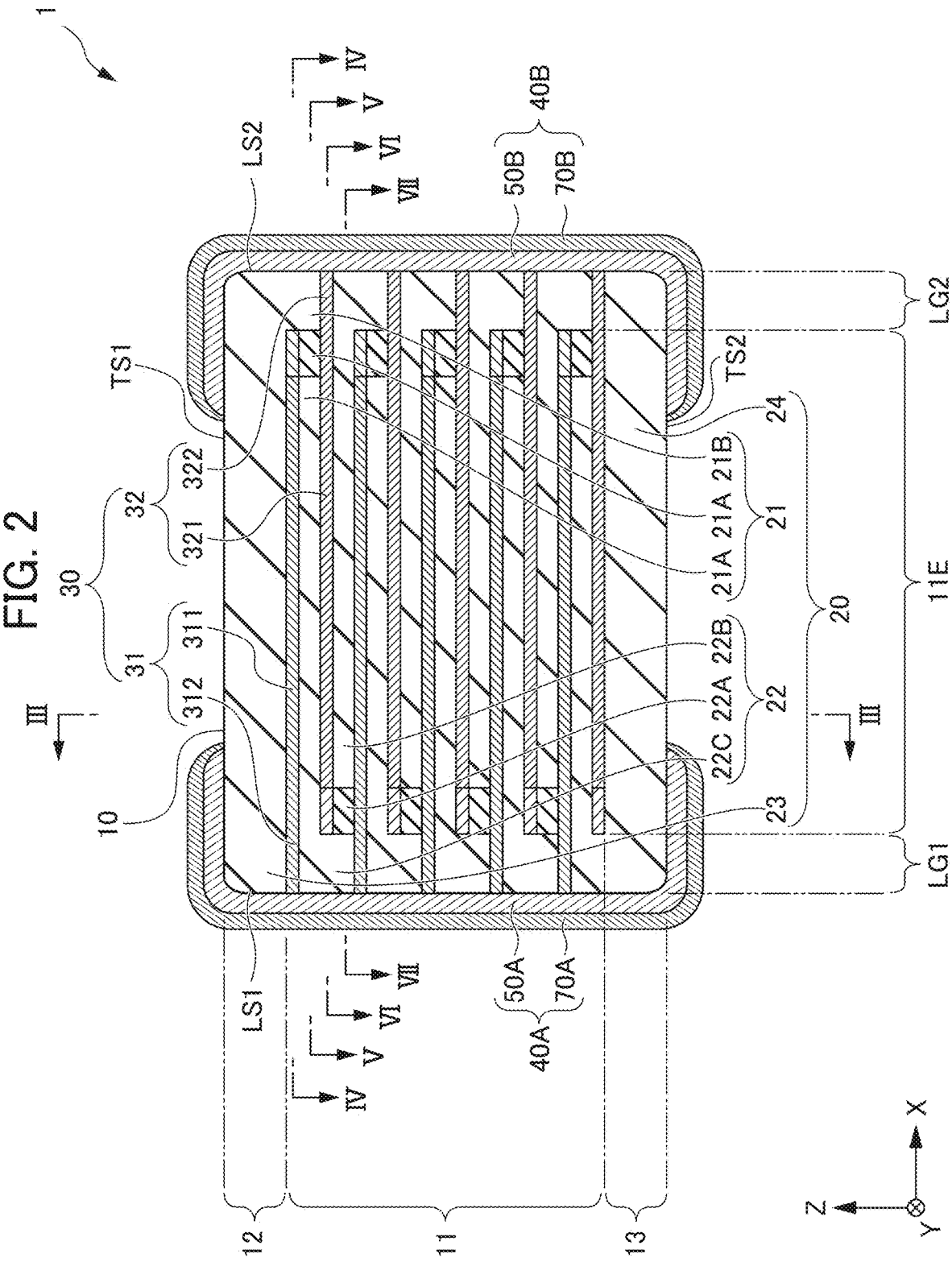
FIG. 2 is a cross-sectional view taken along the line II-II of the multilayer ceramic capacitor shown in FIG. 1.
Figure 3:
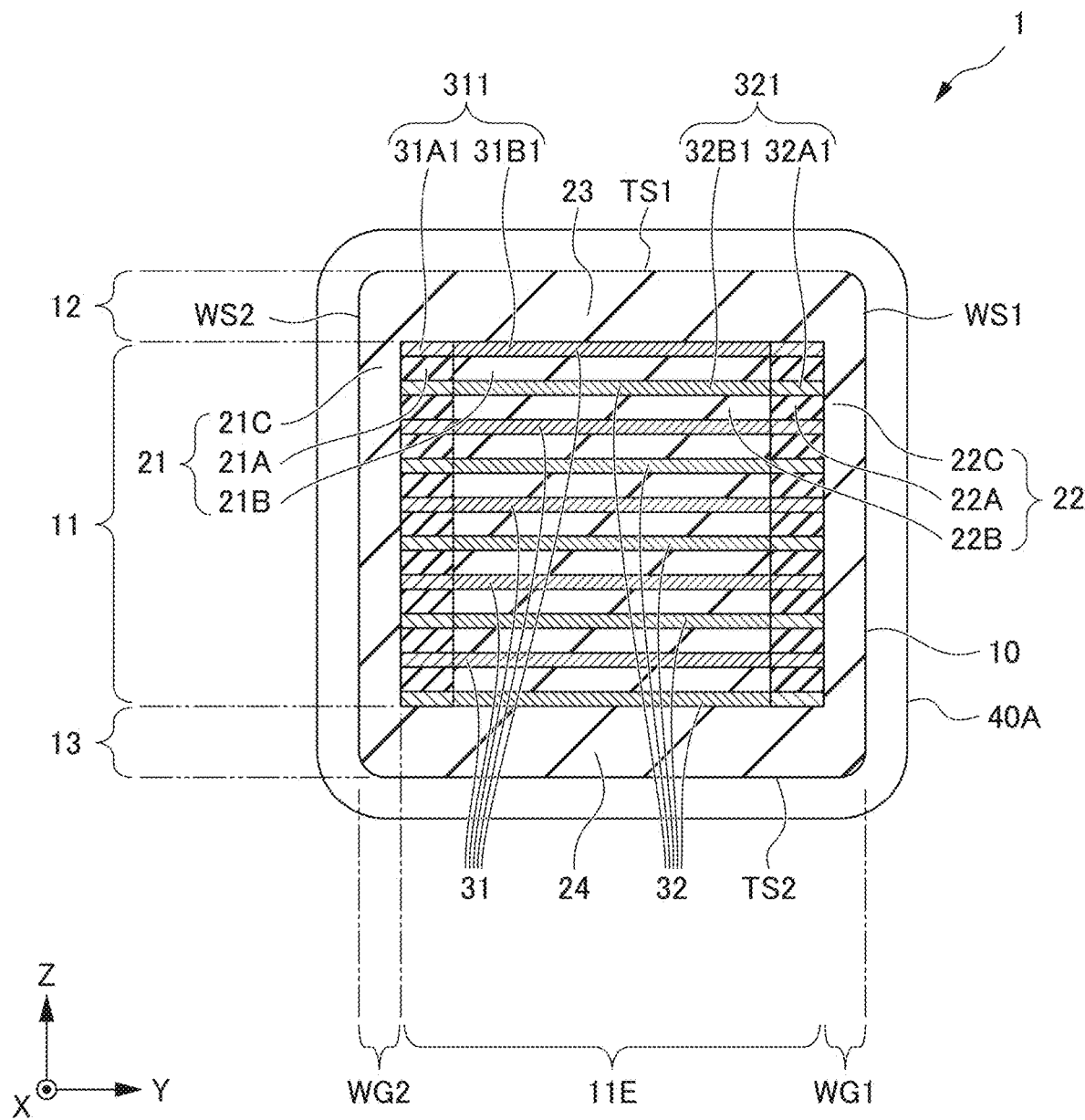
FIG. 3 is a cross-sectional view taken along the line III-III of the multilayer ceramic capacitor shown in FIG. 2.
Figure 4:
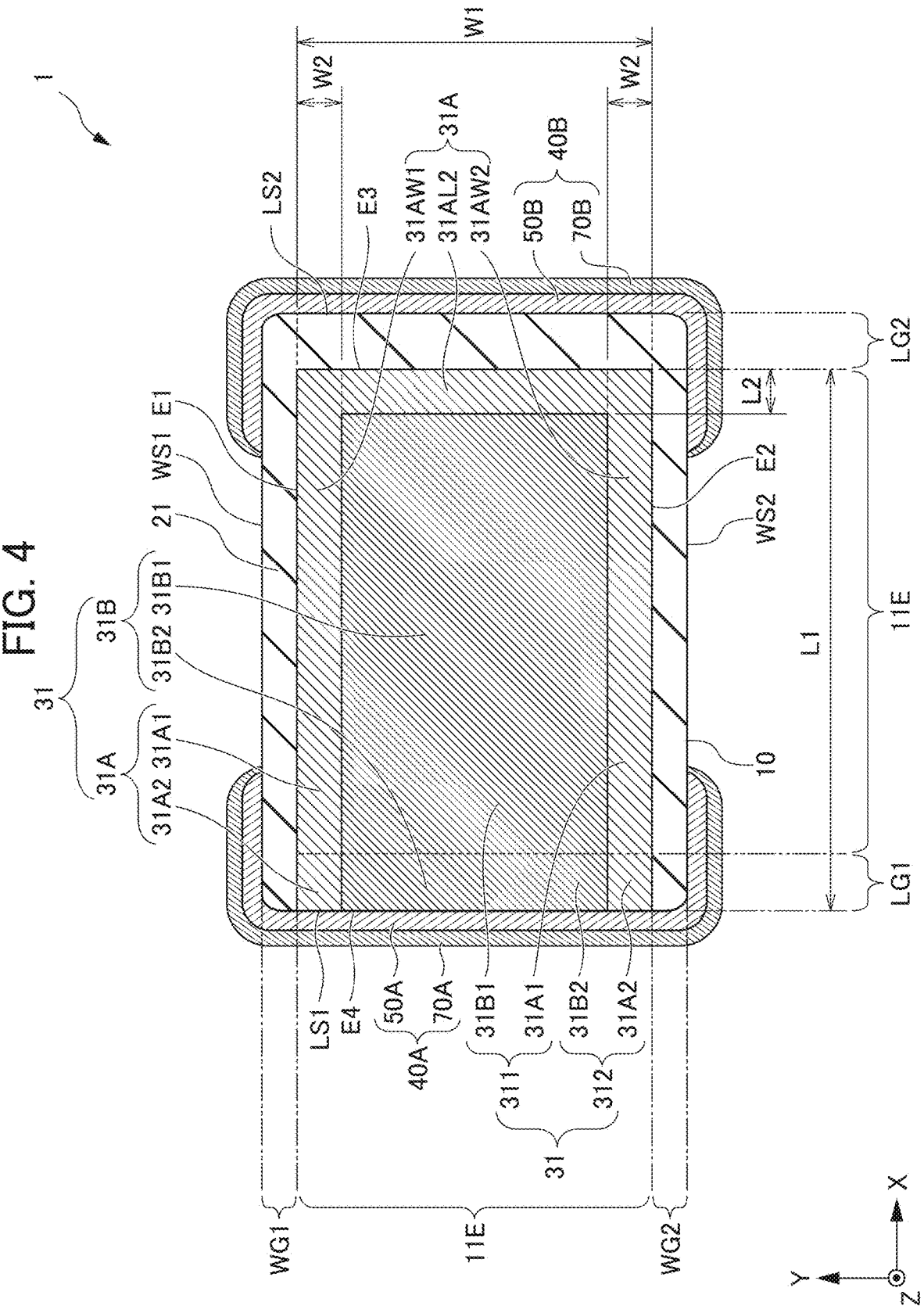
FIG. 4 is a cross-sectional view taken along the line IV-IV of the multilayer ceramic capacitor shown in FIG. 2.
Figure 5:
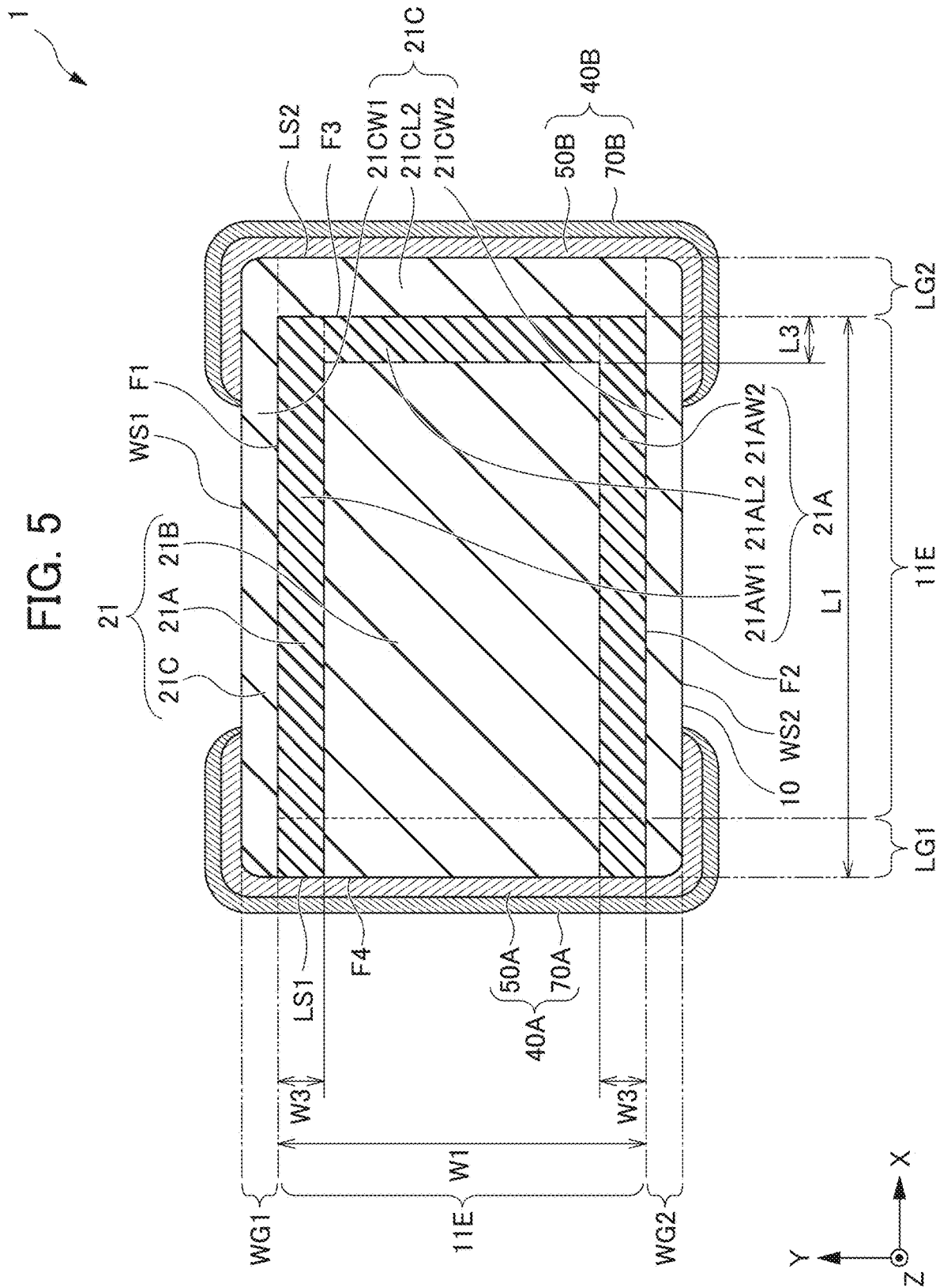
FIG. 5 is a cross-sectional view taken along the line V-V of the multilayer ceramic capacitor shown in FIG. 2.
Figure 6:
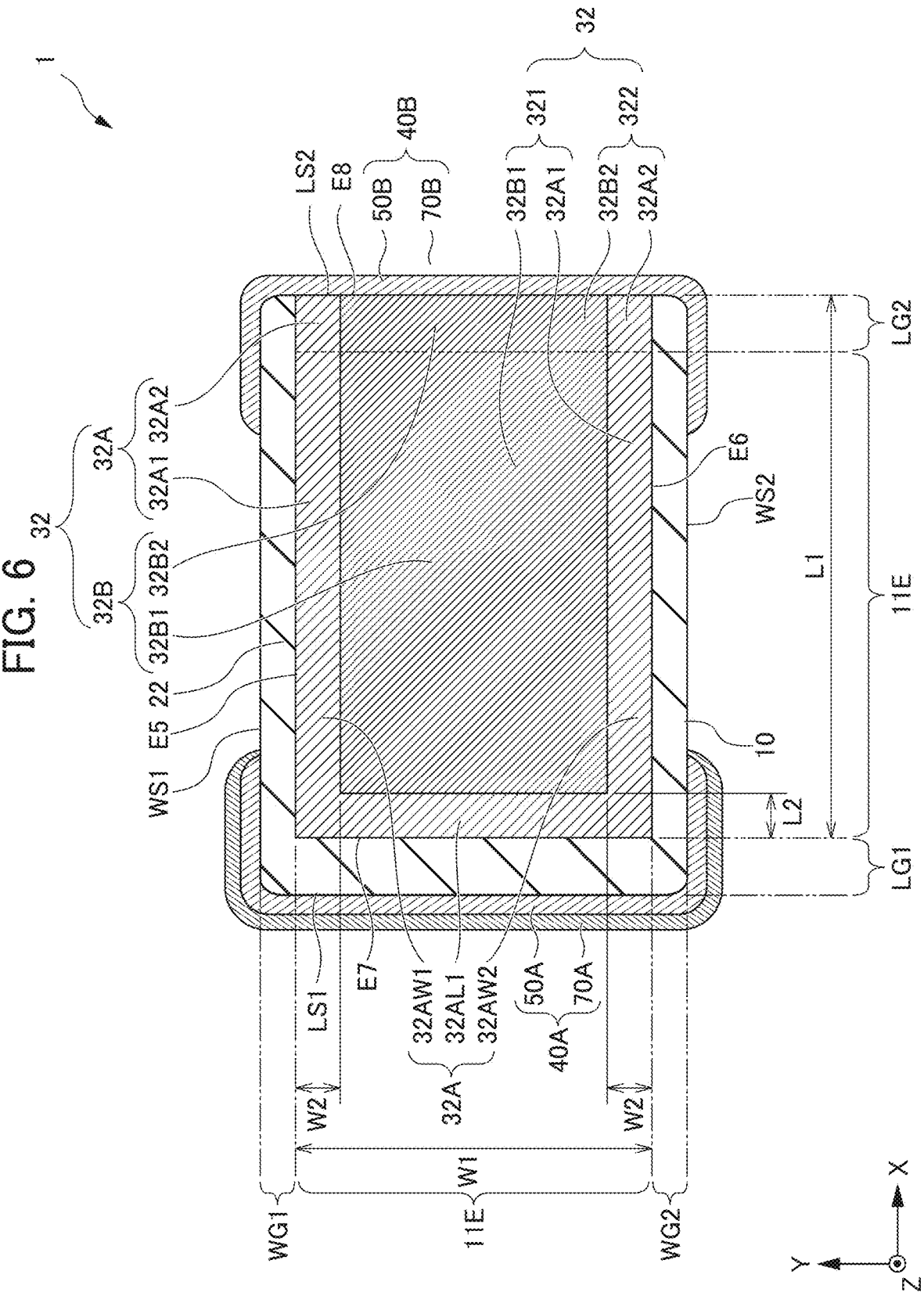
FIG. 6 is a cross-sectional view taken along the line VI-VI of the multilayer ceramic capacitor shown in FIG. 2.
Figure 7:
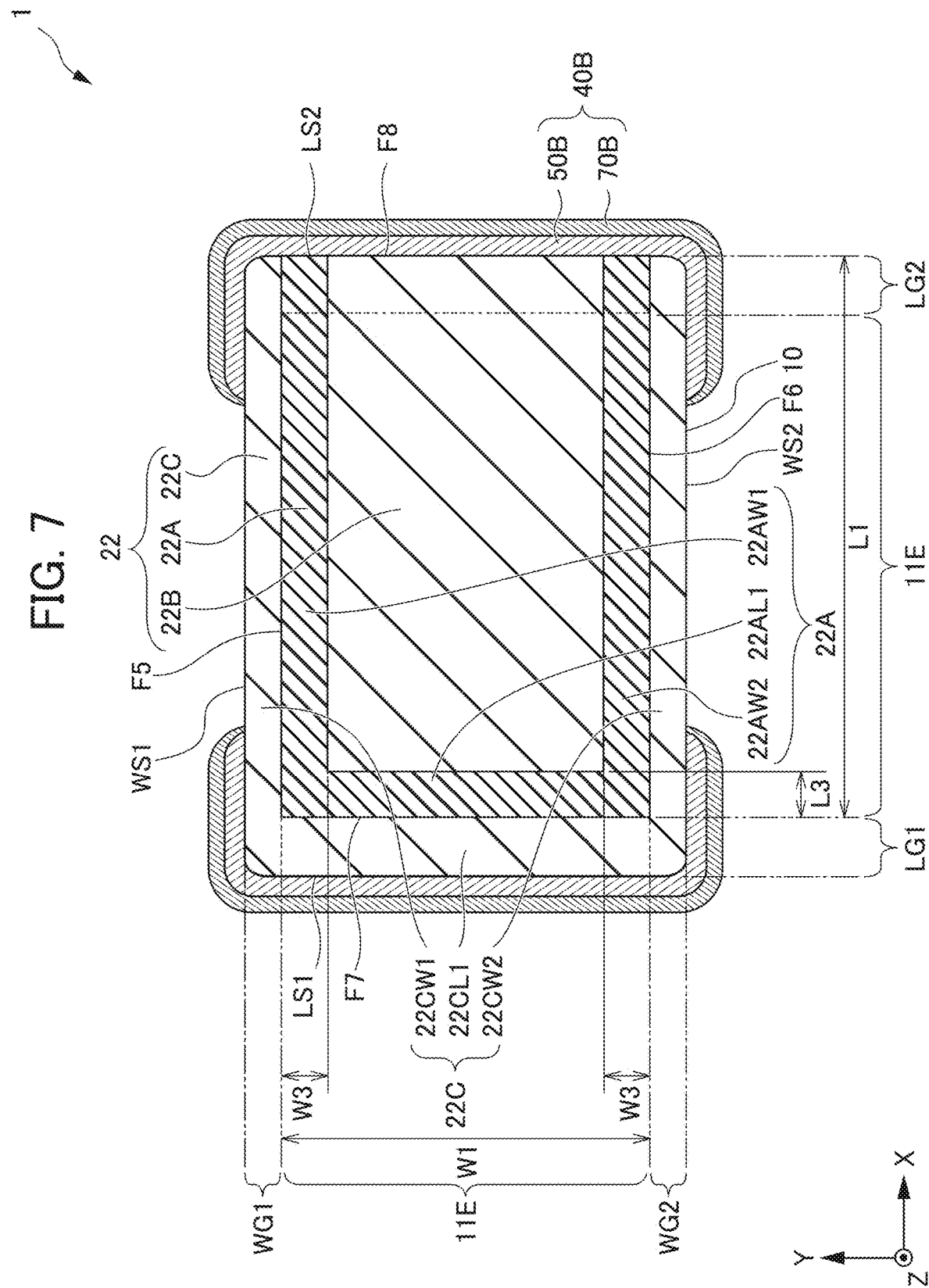
FIG. 7 is a cross-sectional view taken along the line VII-VII of the multilayer ceramic capacitor shown in FIG. 2.

A multilayer ceramic capacitor 1 according to a preferred embodiment of the present invention will be described. FIG. 1 is an external perspective view of a multilayer ceramic capacitor 1 of a preferred embodiment of the present invention. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 shown in FIG. 2. FIG. 4 is a cross-sectional view taken along the line IV-IV of the multilayer ceramic capacitor 1 shown in FIG. 2. FIG. 5 is a cross-sectional view taken along the V-V of the multilayer ceramic capacitor 1 of FIG. 2. FIG. 6 is a cross-sectional view taken along the line VI-VI of the multilayer ceramic capacitor 1 of FIG. 2. FIG. 7 is a cross-sectional view taken along the line VII-VII line of the multilayer ceramic capacitor 1 of FIG. 2.

The multilayer ceramic capacitor 1 includes a multilayer body 10 and external electrodes 40.

The XYZ Cartesian coordinate system is shown in FIGS. 1 to 7. A length direction L of the multilayer ceramic capacitor 1 and the multilayer body 10 corresponds to the X direction. A width direction W of the multilayer ceramic capacitor 1 and the multilayer body 10 corresponds to the Y direction. A height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross-section shown in FIGS. 4 to 7 is also referred to as an LW cross-section.

As shown in FIGS. 1 to 7, the multilayer body 10 includes a first main surface TS1 and a second main surface TS2 opposing in the height direction T, a first side surface WS1 and a second side surface WS2 opposing in the width direction W perpendicular or substantially perpendicular to the height direction T, and a first end surface LS1 and a second end surface LS2 opposing in the length direction L perpendicular or substantially perpendicular to the height direction T and the width direction W.

As shown in FIG. 1, the multilayer body 10 has a rectangular or substantially rectangular parallelepiped shape. The dimension of the multilayer body 10 in the length direction L is not necessarily longer than the dimension of the width direction W. The corners and ridges of the multilayer body 10 are preferably rounded. The corners are portions where the three surfaces of the multilayer body intersect, and the ridges are portions where the two surfaces of the multilayer body intersect. Unevenness or the like may be provided on a portion or the entirety or substantially the entirety of the surface of the multilayer body 10.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrodes 30. The inner layer portion 11 includes, in the height direction T, from the internal electrode 30 located closest to the first main surface TS1 to the internal electrode 30 located closest to the second main surface TS2. In the inner layer portion 11, a plurality of internal electrodes 30 are opposed to each other with the dielectric layer 20 interposed therebetween. The inner layer portion 11 generates a capacitance and substantially defines and functions as a capacitor.

The plurality of dielectric layers 20 used in the inner layer portion 11 include a plurality of first dielectric layers 21 and a plurality of second dielectric layers 22. The plurality of first dielectric layers 21 and the plurality of second dielectric layers 22 are embedded so as to be alternately provided in the height direction T in the multilayer body 10 with the internal electrode 30 interposed therebetween.

The plurality of dielectric layers 20 are each made of a dielectric material. The dielectric material may be, for example, a dielectric ceramic including a component such as $BaTiO_3$, $CaTiO_3$, $SrTiO_3$, or $CaZrO_3$. Furthermore, the dielectric material may be obtained by adding a secondary component such as, for example, a Mn compound, an Fe compound, a Cr compound, a Co compound, or a Ni compound to the main component.

The thicknesses of the dielectric layers 20 are each preferably about 0.5 μm or more and about 10 μm or less, for example. The number of the dielectric layers 20 to be laminated (stacked) is preferably fifteen or more and 700 or less, for example. The number of the dielectric layers 20 refers to the total number of dielectric layers in the inner layer portion 11, and dielectric layers in the first main surface-side outer layer portion 12 and the second main surface-side outer layer portion 13.

The detailed configuration of the dielectric layers 20 will be described later.

The plurality of internal electrodes 30 include a plurality of first internal electrodes 31 and a plurality of second internal electrodes 32. The first internal electrode 31 is provided on the first dielectric layer 21. The second internal electrode 32 is provided on the second dielectric layer 22. The plurality of first internal electrodes 31 and the plurality of second internal electrodes 32 are embedded so as to be alternately provided in the height direction T of the multilayer body 10 with the dielectric layer 20 interposed therebetween.

As shown in FIGS. 2 and 4, the first internal electrode 31 includes a first opposing portion 311 facing the second internal electrode 32, and a first lead-out portion 312 extending from the first opposing portion 311 to the first end surface LS1. The first lead-out portion 312 is exposed at the first end surface LS1.

As shown in FIGS. 2 and 6, the second internal electrode 32 includes a second opposing portion 321 facing the first internal electrode 31, and a second lead-out portion 322 extending from the second opposing portion 321 to the second end surface LS2. The second lead-out portion 322 is exposed at the second end surface LS2.

In the present preferred embodiment, the first opposing portion 311 and the second opposing portion 321 are opposed to each other with the dielectric layers 20 interposed therebetween, such that a capacitance is generated, and the characteristics of a capacitor are provided.

The first internal electrode 31 and the second internal electrode 32 are each made of an appropriate conductive material including, for example, a metal such as Ni, Cu, Ag, Pd, and Au, and an alloy including at least one of these metals. When using an alloy, the first internal electrode 31 and the second internal electrode 32 may be made of a Ag—Pd alloy or the like, for example.

The total number of the first internal electrodes 31 and the second internal electrodes 32 is preferably fifteen or more and 700 or less, for example.

The detailed configuration of the internal electrodes 30 will be described later.

The first main surface-side outer layer portion 12 is located in the vicinity of the first main surface TS1 of the multilayer body 10. The first main surface-side outer layer portion 12 is an assembly of a plurality of dielectric layers 20 located between the first main surface TS1 and the internal electrode 30 closest to the first main surface TS1. The dielectric layers 20 in the first main surface-side outer layer portion 12 may be the same as the first dielectric layers 21 or the second dielectric layers 22 in the inner layer portion 11. However, as shown in FIG. 2, the dielectric layers 20 in the first main surface side-outer layer portion 12 are preferably defined by a dielectric layer 23 having a uniform dielectric constant.

The second main surface-side outer layer portion 13 is located in the vicinity of the second main surface TS2 of the multilayer body 10. The second main surface-side outer layer portion 13 is an assembly of a plurality of dielectric layers 20 located between the second main surface TS2 and the internal electrode 30 closest to the second main surface TS2. The dielectric layers 20 in the second main surface-side outer layer portion 13 may be the same as the first dielectric layers 21 or the second dielectric layers 22 in the inner layer portion 11. However, as shown in FIG. 2, the dielectric layers 20 in the second main surface-side outer layer portion 13 are preferably defined by a dielectric layer 24 having a uniform dielectric constant.

It should be noted that the multilayer body 10 includes a counter electrode portion 11E. The counter electrode portion 11E refers to a portion where a first opposing portion 311 of the first internal electrode 31 and the second opposing portion 321 of the second internal electrode 32 face each other. The counter electrode portion 11E defines and functions as a portion of the inner layer portion 11. FIG. 2 shows the range of the counter electrode portion 11E in the length direction L. FIG. 3 also shows the range of the counter electrode portion 11E in the width direction W. FIGS. 4 to 7 each show the range of the counter electrode portion 11E in the width direction W and the length direction L. The counter electrode portion 11E is also referred to as a capacitor active portion.

The multilayer body 10 includes side surface-side outer layer portions WG. The side surface-side outer layer portions WG include a first side surface-side outer layer portion WG1 and a second side surface-side outer layer portion WG2. The first side surface-side outer layer portion WG1 includes the dielectric layer 20 located between the counter electrode portion 11E and the first side surface WS1. The second side surface-side outer layer portion WG2 includes the dielectric layer 20 located between the counter electrode portion 11E and the second side surface WS2. FIGS. 3 to 7 each show the ranges of the first side surface-side outer layer portion WG1 and the second side surface-side outer layer portion WG2 in the width direction W. The side surface-side outer layer portions WG are also each referred to as a W gap or a side gap.

The multilayer body 10 includes end surface-side outer layer portions LG. The end surface-side outer layer portions LG include a first end surface-side outer layer portion LG1 and a second end surface-side outer layer portion LG2. The first end surface-side outer layer portion LG1 includes the dielectric layer 20 located between the counter electrode portion 11E and the first end surface LS1. The second end surface-side outer layer portion LG2 includes the dielectric layer 20 located between the counter electrode portion 11E and the second end surface LS2. FIGS. 2 to 7 each show the ranges of the first end surface-side outer layer portion LG1 and the second end surface-side outer layer portion LG2 in the length direction L. The end surface-side outer layer portions LG are also each referred to as an L gap or an end gap.

Here, a detailed configuration of the internal electrodes 30 will be described.

As shown in FIG. 4, the first internal electrodes 31 include a first side E1 in the vicinity of the first side surface WS1, a second side E2 in the vicinity of the second side surface WS2, a third side E3 in the vicinity of the second end surface LS2, and a fourth side E4 in the vicinity of the first end surface LS1. The first internal electrodes 31 include a first outer peripheral portion 31A located in the vicinity of the three sides E1 to E3 except for the fourth side E4, which extends to the first end surface, among these four sides E1 to E4, and a first inner electrode portion 31B located inside the first outer peripheral portion 31A. The first side E1 to the fourth side E4 of the first internal electrodes 31 define the outer edge of the first internal electrodes 31.

The first inner electrode portion 31B includes a first opposing portion region 31B1 located in the first opposing portion 311, and a first lead-out portion region 31B2 located in the first lead-out portion 312. The first outer peripheral portion 31A includes a first opposing portion region 31A1 located in the first opposing portion 311, and a first lead-out portion region 31A2 located in the first lead-out portion 312. The first outer peripheral portion 31A may also be divided as follows. That is, the first outer peripheral portion 31A may include a first side surface-side region 31AW1 located in the vicinity of the first side surface WS1, a second side surface-side region 31AW2 located in the vicinity of the second side surface WS2, and a second end surface-side region 31AL2 located in the vicinity of the second end surface LS2.

A length L2 in the length direction connecting the first end surface LS1 and the second end surface LS2, of the second end surface-side region 31AL2 of the first outer peripheral portion 31A is preferably, for example, about 5% or more and about 10% or less of a length L1 connecting the fourth side E4 in the vicinity of the first end surface LS1 and the third side E3 in the vicinity of the second end surface LS2 of the first internal electrodes 31. A length W2 in the width direction connecting the first side surface WS1 and the second side surface WS2 of the first side surface-side region 31AW1 of the first outer peripheral portion 31A is preferably, for example, about 5% or more and about 20% or less of a length W1 in the width direction connecting the first side E1 in the vicinity of the first side surface WS1 and the second side E2 in the vicinity of the second side surface WS2 of the first internal electrodes 31. A length W2 in the width direction connecting the first side surface WS1 and the second side surface WS2 of the second side surface-side region 31AW2 of the first outer peripheral portion 31A is preferably, for example, about 5% or more and about 20% or less of the length W1 in the width direction connecting the first side E1 in the vicinity of the first side surface WS1 and the second side E2 in the vicinity of the second side surface WS2 of the first internal electrodes 31.

Here, when the coverage of the first internal electrodes 31 relative to the first dielectric layers 21 in the first outer peripheral portion 31A is defined as A1, and the coverage of the first internal electrodes 31 relative to the first dielectric layers 21 in the first inner electrode portion 31B is defined as B1, the relationship between them is expressed as A1<B1. For example, the coverage A1 of the first internal electrodes 31 relative to the first dielectric layers 21 in the first outer peripheral portion 31A is, for example, about 55% or more and about 75% or less. Furthermore, the coverage B1 of the first internal electrodes 31 relative to the first dielectric layers 21 in the first inner electrode portion 31B is, for example, a value in the range of about 72% or more and about 98% or less, and higher than at least the coverage A1. It should be noted that the first outer peripheral portion 31A is also referred to as a first low coverage portion 31A. The first inner electrode portion 31B is also referred to as a first high coverage portion 31B.

The thicknesses of the first internal electrodes 31 located in the first outer peripheral portion 31A are each preferably, for example, about 0.1 µm or more and about 0.5 µm or less. The thicknesses of the first internal electrodes 31 located in the first inner electrode portion 31B are each preferably, for example, about 0.3 µm or more and about 0.7 µm or less. The advantageous effects obtained by the configuration of the present preferred embodiment are more likely to be improved in these ranges.

As shown in FIG. 6, the second internal electrodes 32 include a fifth side E5 in the vicinity of the first side surface WS1, a sixth side E6 in the vicinity of the second side surface WS2, a seventh side E7 in the vicinity of the first end surface LS1, and an eighth side E8 in the vicinity of the second end surface LS2. The second internal electrodes 32 include a second outer peripheral portion 32A located in the vicinity of the three sides E5 to E7 except for the eighth side E8, which extends to the second end surface, among these four sides E5 to E8, and a second inner electrode portion 32B located inside the second outer peripheral portion 32A. The fifth side E5 to the eighth side E8 of the second internal electrodes 32 define the outer edge of the second internal electrodes 32.

The second inner electrode portion 32B includes a second opposing portion region 32B1 located in the second opposing portion 321, and a second lead-out portion region 32B2 located in the second lead-out portion 322. The second outer peripheral portion 32A includes a second opposing portion region 32A1 located in the second opposing portion 321, and a second lead-out portion region 32A2 located in the second lead-out portion 322. The second outer peripheral portion 32A may also be divided as follows. That is, the second outer peripheral portion 32A may include a first side surface-side region 32AW1 located in the vicinity of the first side surface WS1, a second side surface-side region 32AW2 located in the vicinity of the second side surface WS2, and a first end surface-side region 32AL1 located in the vicinity of the first end surface LS1.

A length L2 in the length direction connecting the first end surface LS1 and the second end surface LS2, of the first end surface-side region 32AL1 of the second outer peripheral portion 32A is preferably, for example, about 5% or more and about 10% or less of a length L1 connecting the seventh side E7 in the vicinity of the first end surface LS1 and the eighth side E8 in the vicinity of the second end surface LS2 of the second internal electrodes 32. A length W2 in the width direction connecting the first side surface WS1 and the second side surface WS2 of the first side surface-side region 32AW1 of the second outer peripheral portion 32A is preferably, for example, about 5% or more and about 20% or less of a length W1 in the width direction connecting the fifth side E5 in the vicinity of the first side surface WS1 and the sixth side E6 in the vicinity of the second side surface WS2 of the second internal electrodes 32. A length W2 in the width direction connecting the first side surface WS1 and the second side surface WS2 of the second side surface-side region 32AW2 of the second outer peripheral portion 32A is preferably, for example, about 5% or more and about 20% or less of the length W1 in the width direction connecting the fifth side E5 in the vicinity of the first side surface WS1 and the sixth side E6 in the vicinity of the second side surface WS2 of the second internal electrodes 32.

Here, when the coverage of the second internal electrodes 32 relative to the second dielectric layers 22 in the second outer peripheral portion 32A is defined as A2, and the coverage of the second internal electrodes 32 relative to the second dielectric layers 22 in the second inner electrode portion 32B is defined as B2, the relationship between them is expressed as A2<B2. For example, the coverage A2 of the second internal electrodes 32 relative to the second dielectric layers 22 in the second outer peripheral portion 32A is, for example, about 55% or more and about 75% or less. Furthermore, the coverage B2 of the second internal electrodes 32 relative to the second dielectric layers 22 in the second inner electrode portion 32B is, for example, a value in the range of about 72% or more and about 98% or less, and higher than at least the coverage A2. The second outer peripheral portion 32A is also referred to as a second low coverage portion 32A. The second inner electrode portion 32B is also referred to as a second high coverage portion 32B.

The thicknesses of the second internal electrodes 32 located in the second outer peripheral portion 32A are each preferably, for example, about 0.1 μm or more and about 0.5 μm or less. The thicknesses of the second internal electrodes 32 located in the second inner electrode portion 32B are each preferably, for example, about 0.3 μm or more and about 0.7 μm or less. The advantageous effects obtained by the configuration of the present preferred embodiment is more likely to be improved in the case of these ranges.

Next, a detailed configuration of the dielectric layer 20 will be described.

As shown in FIG. 5, the first dielectric layers 21 includes four sides in the region where the first internal electrodes 31 are provided. That is, the first dielectric layers 21 includes, in the region where the first internal electrodes 31 are provided, a first side F1 in the vicinity of the first side surface WS1, a second side F2 in the vicinity of the second side surface WS2, a third side F3 in the vicinity of the second end surface LS2, and a fourth side F4 in the vicinity of the first end surface LS1. The first dielectric layers 21 include a first high dielectric constant portion 21A located in the vicinity of the three sides F1 to F3, except for the fourth side F4 located in the vicinity of the first end surface, among these four sides F1 to F4, and a first inner dielectric layer portion 21B located in the interior of the first high dielectric constant portion 21A. The first dielectric layers 21 further include a first outer dielectric layer portion 21C on the outside of the first high dielectric constant portion 21A.

The first high dielectric constant portion 21A includes a first side surface-side region 21AW1 located in the vicinity of the first side surface WS1, a second side surface-side region 21AW2 located in the vicinity of the second side surface WS2, and a second end surface-side region 21AL2 located in the vicinity of the second end surface LS2. The first outer dielectric layer portion 21C includes a first side surface-side region 21CW1 located in the vicinity of the first side surface WS1, a second side surface-side region 21CW2 located in the vicinity of the second side surface WS2, and a second end surface-side region 21CL2 located in the vicinity of the second end surface LS2.

A length L3 in the length direction connecting the first end surface LS1 and the second end surface LS2 of the second end surface-side region 21AL2 of the first high dielectric constant portion 21A is preferably, for example, about 5% or more and about 20% or less of a length L1 connecting the fourth side E4 in the vicinity of the first end surface LS1 and the third side E3 in the vicinity of the second end surface LS2 of the first internal electrodes 31. When the length L3 is, for example, smaller than about 5% of the length L1, the area of the high dielectric constant portion of the dielectric layer cannot be sufficiently secured, and the effect of improving the capacitance is reduced. On the other hand, when the length L3 is, for example, larger than about 20% of the length L1, the area of the high dielectric constant portion of the dielectric layer is too large, and reliability degradation may occur due to high temperature loading.

A length W3 in the width direction connecting the first side surface WS1 and the second side surface WS2 of the first side surface-side region 21AW1 of the first high dielectric constant portion 21A is preferably, for example, about 5% or more and about 30% or less of a length W1 in the width direction connecting the first side E1 in the vicinity of the first side surface WS1 and the second side E2 in the vicinity of the second side surface WS2 of the first internal electrodes 31. A length W3 in the width direction connecting the first side surface WS1 and the second side surface WS2 of the second side surface-side region 21AW2 of the first high dielectric constant portion 21A is preferably, for example, about 5% or more and about 30% or less of a length W1 in the width direction connecting the first side E1 in the vicinity of the first side surface WS1 and the second side E2 in the vicinity of the second side surface WS2 of the first internal electrodes 31. When the length W3 is, for example, smaller than about 5% of the length W1, the area of the high dielectric constant portion of the dielectric layer cannot be sufficiently secured, and the effect of improving the capacitance is reduced. On the other hand, when the length W3 is, for example, larger than about 30% of the length W1, the area of the high dielectric constant portion of the dielectric layer is too large, and reliability degradation may occur due to high temperature loading.

When viewed in the lamination direction, the first side F1 to the fourth side F4 of the first dielectric layers 21 respectively overlap the first side E1 to the fourth side E4 defining the outer edge of the first internal electrodes 31. Furthermore, the first side F1 of the first dielectric layer 21 is a line including a border between the counter electrode portion 11E and the first side surface-side outer layer portion WG1. The second side F2 of the first dielectric layer 21 is a line including a border between the counter electrode portion 11E and the second side surface-side outer layer portion WG2. The third side F3 of the first dielectric layers 21 is a border between the counter electrode portion 11E and the second end surface-side outer layer portion LG2. That is, the first side F1 to the third side F3 of the first dielectric layers 21 include at least a portion of a virtual line that defines the counter electrode portion 11E in the first dielectric layers 21. Furthermore, in the present preferred embodiment, the first side F1 to the third side F3 of the first dielectric layer 21 provide an outer edge portion of the first high dielectric constant portion 21A.

At least a portion of the first high dielectric constant portion 21A of the first dielectric layer 21 is provided at a position sandwiched between the first low-coverage portion 31A (the first outer peripheral portion 31A) of the first internal electrodes 31 and the second low coverage portion 32A (the second outer peripheral portion 32A) of the second internal electrodes 32.

As shown in FIG. 7, the second dielectric layers 22 include four sides in the region where the second internal electrodes 32 are provided. That is, the second dielectric layers 22 include, in the region where the second internal electrodes 32 are provided, the fifth side F5 in the vicinity of the first side surface WS1, the sixth side F6 in the vicinity of the second side surface WS2, the seventh side F7 in the vicinity of the first end surface LS1, and the eighth side F8 in the vicinity of the second end surface LS2. The second dielectric layers 22 include a second high dielectric constant portion 22A located in the vicinity of the three sides F5 to F7 except the eighth side F8 located in the vicinity of the second end surface among these four sides F5 to F8, and a second inner dielectric layer portion 22B located in the interior of the second high dielectric constant portion 22A. The second dielectric layers 22 further include a second outer dielectric layer portion 22C on the outside of the second high dielectric constant portion 22A.

The second high dielectric constant portion 22A includes a first side surface-side region 22AW1 located in the vicinity of the first side surface WS1, a second side surface-side region 22AW2 located in the vicinity of the second side surface WS2, and a first end surface-side region 22AL1 located in the vicinity of the first end surface LS1. The second outer dielectric layer portion 22C includes a first side surface-side region 22CW1 located in the vicinity of the first side surface WS1, a second side surface-side region 22CW2 located in the vicinity of the second side surface WS2, and a first end surface-side region 22CL1 located in the vicinity of the first end surface LS1.

A length L3 in the length direction connecting the first end surface LS1 and the second end surface LS2 of the first end surface-side region 22AL1 of the second high dielectric constant portion 22A is preferably, for example, about 5% or more and about 20% or less of a length L1 in the length direction connecting the seventh side E7 in the vicinity of the first end surface LS1 and the eighth side E8 in the vicinity of the second end surface LS2 of the second internal electrodes 32. When the length L3 is smaller than, for example, about 5% of the length L1, the area of the high dielectric constant portion of the dielectric layer cannot be sufficiently secured, and the effect of improving the capacitance is reduced. On the other hand, when the length L3 is larger than, for example, about 20% of the length L1, the area of the high dielectric constant portion of the dielectric layer is too large, and reliability degradation may occur due to high temperature loading.

A length W3 in the width direction connecting the first side surface WS1 and the second side surface WS2 of the first side surface-side region 22AW1 of the second high dielectric constant portion 22A is preferably, for example, about 5% or more and about 30% or less of a length W1 in the width direction connecting the fifth side E5 in the vicinity of the first side surface WS1 and the sixth side E6 in the vicinity of the second side surface WS2 of the second internal electrodes 32. A length W3 in the width direction connecting the first side surface WS1 and the second side surface WS2 of the second side surface-side region 22AW2 of the second high dielectric constant portion 22A is preferably, for example, about 5% or more and about 30% or less of the length W1 in the width direction connecting the fifth side E5 in the vicinity of the first side surface WS1 side and the sixth side E6 in the vicinity of the second side surface WS2 of the second internal electrodes 32. When the length W3 is smaller than, for example, about 5% of the length W1, the area of the high dielectric constant portion of the dielectric layer cannot be sufficiently secured, and the effect of improving the capacitance is reduced. On the other hand, when the length W3 is larger than, for example, about 30% of the length W1, the area of the high dielectric constant portion of the dielectric layer is too large, and reliability degradation may occur due to high temperature loading.

When viewed in the lamination direction, the fifth side F5 to the eighth side F8 of the second dielectric layers 22 respectively overlap the fifth side E5 to the eighth side E8 defining the outer edge of the second internal electrodes 32. Furthermore, the fifth side F5 of the second dielectric layer 22 is a line including a border between the counter electrode portion 11E and the first side surface-side outer layer portion WG1. The sixth side F6 of the second dielectric layer 22 is a line including a border between the counter electrode portion 11E and the second side surface-side outer layer portion WG2. The seventh side F7 of the second dielectric layers 22 is a border between the counter electrode portion 11E and the first end surface-side outer layer portion LG1. That is, the fifth side F5 to the seventh side F7 of the second dielectric layers 22 include at least a portion of a virtual line that defines the counter electrode portion 11E in the second dielectric layers 22. Furthermore, in the present preferred embodiment, the fifth side F5 to the seventh side F7 of the second dielectric layer 22 provides an outer edge portion of the second high dielectric constant portion 22A.

At least a portion of the second high dielectric constant portion 22A of the second dielectric layer 22 is provided at a position sandwiched between the first low-coverage portion 31A (the first outer peripheral portion 31A) of the first internal electrodes 31 and the second low-coverage portion 32A (the second outer peripheral portion 32A) of the second internal electrodes 32.

Here, when the relative dielectric constant of the dielectric layer in the first high dielectric constant portion 21A is defined as A3, and the relative dielectric constant of the dielectric layer in the first inner dielectric layer portion 21B is defined as B3, the relationship between them is expressed as A3>B3. For example, the relative dielectric constant A3 of the dielectric layer in the first high dielectric constant portion 21A relative to the relative dielectric constant B3 of the first inner dielectric layer portion 21B is preferably, for example, higher in the range of about 5% or more about 25% or less. As a result, the effect of the present preferred embodiment can be made more remarkable. More specifically, the relative dielectric constant A3 of the dielectric layer in the first high dielectric constant portion 21A is preferably, for example, about 3500 or more and about 4000 or less, and the relative dielectric constant B3 of the dielectric layer in the first inner dielectric layer portion 21B is preferably, for example, about 3000 or more and about 3400 or less. The relative dielectric constant of the dielectric layer of the first outer dielectric layer portion 21C is preferably, for example, about 3000 or more and about 4000 or less.

The first inner dielectric layer portion 21B is also referred to as the first low dielectric constant portion 21B, since the first inner dielectric layer portion 21B is lower in the relative dielectric constant than the first high dielectric constant portion 21A.

The first outer dielectric layer portion 21C may be made of a material having a lower relative dielectric constant than the first high dielectric constant portion 21A. For example, the first outer dielectric layer portion 21C may be made of the same or substantially the same material as the first inner dielectric layer portion 21B. In this case, it is possible to ensure higher reliability. Furthermore, the first outer dielectric layer portion 21C may be made of the same or substantially the same material as the first high dielectric constant portion 21A. In this case, the manufacture of the dielectric sheet of the first dielectric layer 21 (green sheet) is facilitated.

When the relative dielectric constant of the dielectric layer in the second high dielectric constant portion 22A is defined as A4, and the relative dielectric constant of the dielectric layer in the second inner dielectric layer portion 22B is defined as B4, the relationship between them is expressed as A4>B4. For example, the relative dielectric constant A4 of the dielectric layer in the second high dielectric constant portion 22A relative to the relative dielectric constant B4 of the second inner dielectric layer portion 22B is preferably, for example, higher in the range of about 5% or more about 25% or less. As a result, the advantageous effects of the present preferred embodiment can be improved. More specifically, the relative dielectric constant A4 of the dielectric layer in the second high dielectric constant portion 22A is preferably, for example, about 3500 or more and about 4000 or less, and the relative dielectric constant B4 of the dielectric layer in the second inner dielectric layer portion 22B is preferably, for example, about 3000 or more and about 3400 or less. The relative dielectric constant of the dielectric layer of the second outer dielectric layer portion 22C is preferably, for example, about 3000 or more and about 4000 or less.

The second inner dielectric layer portion 22B is also referred to as the second low dielectric constant portion 22B, since the second inner dielectric layer portion 22B is lower in the relative dielectric constant than the second high dielectric constant portion 22A.

The second outer dielectric layer portion 22C may be made of a material having a lower relative dielectric constant than the second high dielectric constant portion 22A. For example, the second outer dielectric layer portion 22C may be made of the same or substantially the same material as the second inner dielectric layer portion 22B. In this case, it is possible to ensure higher reliability. Furthermore, the second outer dielectric layer portion 22C may be made of the same or substantially the same material as the second high dielectric constant portion 22A. In this case, the manufacture of the dielectric sheet of the second dielectric layer 22 (green sheet) is facilitated.

Here, the covering ratio of the first high dielectric constant portion 21A to the first outer peripheral portion 31A is preferably, for example, about 68% or more and about 187% or less. Furthermore, the covering ratio of the second high dielectric constant portion 22A to the second outer peripheral portion 32A is preferably, for example, about 68% or more and about 187% or less. Thus, by increasing the relative dielectric constant of the dielectric layer 20 corresponding to the portion in which the coverage of the internal electrodes 30 relative to the dielectric layers 20 is small, it is possible to reduce or prevent a decrease in capacitance, and maintain high reliability without increasing the relative dielectric constant of the dielectric layer 20 in the entire multilayer body 10.

As described above, miniaturization, higher capacitance, and improved reliability of the multilayer ceramic capacitor, have been required. Therefore, making the dielectric layers thinner, increasing the number of layers, and making the internal electrodes thinner have been attempted. In order to achieve such thinning of the internal electrodes, a conductive paste having a low viscosity including many solvents is used as the conductive paste for the internal electrodes. Meanwhile, as a printing screen for printing the conductive paste, a screen in which the opening of a mesh pattern is uniform is often used. Therefore, in the internal electrode pattern after printing, a thickness of the outer peripheral portion is usually tapered with respect to the green sheet surface of the dielectric layer. When sintered in this state, since the metal powder such as, for example, Ni of the internal electrode pattern is sintered, the printed internal electrode pattern shrinks omnidirectionally, and thus, becomes even thinner. Therefore, in the internal electrodes after firing, voids are likely to be generated particularly in the vicinity of the thin outer peripheral portion. When such voids are generated in the internal electrodes, the area of the internal electrodes varies. Therefore, a problem occurs in that the capacitance decreases due to a decrease in the active area contributing to the generation of the capacitance. To address this problem, one possible way is, for example, to increase the capacitance by increasing the relative dielectric constant in all of the dielectric layers of the multilayer ceramic capacitor.

However, in order to increase the relative dielectric constant in all of the dielectric layers, the overall amount of the additive is preferably reduced to ensure reliability. In this regard, according to the configuration of the present preferred embodiment, since it suffices if the amount of the additive is reduced in the first outer peripheral portion 31A of the first internal electrodes 31 and the second outer peripheral portion 32A of the second internal electrodes 32, it is possible to reduce or prevent the decrease in capacitance and to reduce or minimize the decrease in reliability.

Furthermore, in order to increase the relative dielectric constant in all of the dielectric layers, a high amount of heat is preferably added to promote the sintering of the ceramic during firing. However, when a high amount of heat is applied, the internal electrodes agglomerate in the lateral direction, and the balling or beading phenomenon progresses such that the thickness increases. Thus, the smoothness of the dielectric layers is reduced, and the dielectric layers locally include a thin portion generated therein. When such a thin portion of the dielectric layers is present, since the electric field is concentrated there, reliability is reduced. In this respect, according to the configuration of the present preferred embodiment, since the amount of heat at the time of firing can be reduced, the occurrence of the balling or beading phenomenon can be reduced or prevented. Therefore, concentration of the electric field is less likely to occur, and deterioration of reliability is reduced or prevented.

The external electrodes 40 include a first external electrode 40A and a second external electrode 40B.

The first external electrode 40A is provided on the first end surface LS1. The first external electrode 40A is connected to the first internal electrodes 31. The first external electrode 40A may be provided on a portion of the first main surface TS1 and a portion of the second main surface TS2, and also on a portion of the first side surface WS1 and a portion of the second side surface WS2. In the present preferred embodiment, the first external electrode 40A extends from the first end surface LS1 to a portion of the first main surface TS1, a portion of the second main surface TS2, a portion of the first side surface WS1, and a portion of the second side surface WS2.

The second external electrode 40B is provided on the second end surface LS2. The second external electrode 40B is connected to the second internal electrodes 32. The second external electrodes 40B may be provided on a portion of the first main surface TS1 and a portion of the second main surface TS2, and also on a portion of the first side surface WS1 and a portion of the second side surface WS2. In the present preferred embodiment, the second external electrode 40B extends from the second end surface LS2 to a portion of the first main surface TS1, a portion of the second main surface TS2, a portion of the first side surface WS1, and a portion of the second side surface WS2.

As described above, in the multilayer body 10, the capacitance is generated by the first opposing portions 311 of the first internal electrodes 31 and the second opposing portions 321 of the second internal electrodes 32 opposing each other with the dielectric layers 20 interposed therebetween. Therefore, characteristics of the capacitor are developed between the first external electrode 40A to which the first internal electrodes 31 are connected and the second external electrode 40B to which the second internal electrodes 32 are connected.

The first external electrode 40A includes a first base electrode layer 50A and a first plated layer 70A provided on the first base electrode layer 50A.

The second external electrode 40B includes a second base electrode layer 50B and a second plated layer 70B provided on the second base electrode layer 50B.

The first base electrode layer 50A is provided on the first end surface LS1. The first base electrode layer 50A is connected to the first internal electrodes 31. In the present preferred embodiment, the first base electrode layer 50A extends from the first end surface LS1 to a portion of the first main surface TS1, a portion of the second main surface TS2, a portion of the first side surface WS1, and a portion of the second side surface WS2.

The second base electrode layer 50B is provided on the second end surface LS2. The second base electrode layer 50B is connected to the second internal electrodes 32. In the present preferred embodiment, the second base electrode layer 50B extends from the second end surface LS2 to a portion of the first main surface TS1, a portion of the second main surface TS2, a portion of the first side surface WS1, and a portion of the second side surface WS2.

The first base electrode layer 50A and the second base electrode layer 50B include at least one selected from a fired layer, a conductive resin layer, a thin film layer, and the like, for example. The first base electrode layer 50A and the second base electrode layer 50B of the present preferred embodiment are fired layers. It is preferable that the fired layers each include both a metal component, and either a glass component or a ceramic component, or both the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. As the ceramic component, a ceramic material of the same kind as that of the dielectric layer 20 may be used, or a ceramic material of a different kind may be used. Ceramic components include, for example, at least one selected from $BaTiO_3$, $CaTiO_3$, $(Ba, Ca)TiO_3$, $SrTiO_3$, $CaZrO_3$, and the like.

The fired layer is obtained by, for example, applying a conductive paste including glass and metal to a multilayer body and firing it. The fired layer may be obtained by simultaneously firing a laminate chip including the internal electrodes and the dielectric layers and a conductive paste applied to the laminate chip, or obtained by firing the laminate chip including the internal electrodes and the dielectric layers to obtain a multilayer body, following which the multilayer body is coated with a conductive paste, and subjected to firing. It should be noted that, in a case of simultaneously firing the laminate chip including the internal electrodes and the dielectric layers, it is preferable that the fired layer is formed by firing a material to which a ceramic material instead of glass component is added. In this case, it is particularly preferable to use, as the ceramic material to be added, the same type of ceramic material as the dielectric layer 20. Furthermore, the fired layer may include a plurality of layers.

The thickness in the length direction of the first base electrode layer 50A located in the vicinity of the first end surface LS1 is preferably, for example, about 3 μm or more and about 160 μm or less at the middle portion in the height direction T and the width direction W of the first base electrode layer 50A.

The thickness in the length direction s of the second base electrode layer 50B located in the vicinity of the second end surface LS2 is preferably, for example, about 3 μm or more and about 160 μm or less at the middle portion of the height direction T and the width direction W of the second base electrode layer 50B.

When providing the first base electrode layer 50A to at least one of portions of the first main surface TS1 and the second main surface TS2, the thickness in the height direction of the first base electrode layer 50A provided at this portion is preferably about 3 μm or more and about 40 μm or less at the middle portion in the length direction L and the width direction W of the first base electrode layer 50A provided at this portion, for example.

When providing the first base electrode layer 50A to a portion of at least one surface among the first side surface WS1 and the second side surface WS2, the thickness in the width direction of the first base electrode layer 50A provided at this portion is preferably about 3 μm or more and about 40 μm or less at the middle portion in the length direction L and the height direction T of the first base electrode layer 50A provided at this portion, for example.

When providing the second base electrode layer 50B to a portion at least one surface among the first main surface TS1 and the second main surface TS2, the thickness in the height direction of the second base electrode layer 50B provided at this portion is preferably about 3 μm or more and about 40 μm or less at the middle portion in the length direction L and the width direction W of the second base electrode layer 50B provided at this portion, for example.

When providing the second base electrode layer 50B to a portion at least one surface among the first side surface WS1 and the second side surface WS2, the thickness in the width direction of the second base electrode layer 50B provided at this portion is preferably about 3 μm or more and about 40 μm or less at the middle portion in the length direction L and the height direction T of the second base electrode layer 50B provided at this portion, for example.

The first plated layer 70A and the second plated layer 70B described later may be directly provided on the multilayer body 10 without providing the first base electrode layer 50A and the second base electrode layer 50B.

The first base electrode layer 50A and the second base electrode layer 50B are not limited to the fired layers, and each may be a thin film layer. The thin film layer is formed by a thin film forming method such as, for example, a sputtering method or deposition method. The thin film layer has a thickness of, for example, about 1 μm or less on which metal particles are deposited.

The first plated layer 70A covers the first base electrode layer 50A.

The second plated layer 70B covers the second base electrode layer 50B.

The first plated layer 70A and the second plated layer 70B may include, for example, at least one selected from Cu, Ni, Sn, Ag, Pd, Ag—Pd alloy, Au, or the like. Each of the first plated layer 70A and the second plated layer 70B may include a plurality of layers.

The first plated layer 70A and the second plated layer 70B each preferably have, for example, a two-layer structure in which a Sn plated layer is provided on a Ni plated layer. In this case, the Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. When each of the first plated layer 70A and the second plated layer 70B has the two-layer structure of the Ni plated layer and the Sn plated layer, the thickness of each of the Ni plated layer and the Sn plated layer is preferably about 2 μm or more and about 15 μm or less, for example.

The first external electrode 40A and the second external electrode 40B of the present preferred embodiment may include, for example, a conductive resin layer including conductive particles and a thermosetting resin. When the conductive resin layer is provided as the base electrode layer (the first base electrode layer 50A and the second base electrode layer 50B), the conductive resin layer may be provided so as to cover the fired layer, or may be provided directly on the multilayer body 10 without providing the fired layer. The conductive resin layer may completely cover the fired layer or may cover a portion of the fired layer.

The conductive resin layer including a thermosetting resin is more flexible than a conductive layer made of, for example, a plated film or a fired product of a conductive paste. Therefore, even when an impact caused by physical shock or thermal cycle is applied to the multilayer ceramic capacitor 1, the conductive resin layer defines and functions as a buffer layer. Therefore, the conductive resin layer reduces or prevents the occurrence of cracking in the multilayer ceramic capacitor 1.

Metals of the conductive particles may be, for example, Ag, Cu, Ni, Sn, Bi or alloys including them. The conductive particle preferably includes Ag, for example. The conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the conductive particle.

Furthermore, the conductive particle may be, for example, a metal powder which is coated on the surface of the metal powder with Ag. When using metal powder coated with Ag on the surface of the metal powder, the metal powder is preferably, for example, Cu, Ni, Sn, Bi, or an alloy powder thereof. In order to make the metal of the base material inexpensive while keeping the characteristics of Ag, it is preferable to use a metal powder coated with Ag, for example.

Furthermore, the conductive particle may be formed by, for example, subjecting Cu and Ni to an oxidation prevention treatment. Furthermore, the conductive particle may be, for example, a metal powder coated with Sn, Ni, and Cu on the surface of the metal powder. When using those coated with Sn, Ni, and Cu on the surface of the metal powder, the metal powder is preferably, for example, Ag, Cu, Ni, Sn, Bi, or an alloy powder thereof.

The shape of the conductive particle is not particularly limited. For the conductive particle, a spherical metal powder, a flat metal powder, or the like can be used. However, it is preferable to use a mixture of a spherical metal powder and a flat metal powder.

The conductive particles included in the conductive resin layer mainly ensures the conductivity of the conductive resin layer. Specifically, by a plurality of conductive particles being in contact with each other, an energization path is provided inside the conductive resin layer.

The resin of the conductive resin layer may include, for example, at least one selected from a variety of known thermosetting resins such as epoxy resin, phenolic resin, urethane resin, silicone resin, polyimide resin, and the like. Among those, epoxy resin has excellent heat resistance, moisture resistance, adhesion, etc., and thus, is one of the more preferable resins. Furthermore, it is preferable that the resin of the conductive resin layer includes a curing agent together with, for example, a thermosetting resin. When epoxy resin is used as a base resin, the curing agent for the epoxy resin may be various known compounds such as, for example, phenols, amines, acid anhydrides, imidazoles, active esters, and amide-imides.

It should be noted that the conductive resin layer may include a plurality of layers. The thickest portion of the conductive resin layer is preferably about 10 µm or more and about 150 µm or less, for example.

The external electrode 40 may include only the plated layer without providing the first base electrode layer 50A and the second base electrode layer 50B. That is, the multilayer ceramic capacitor 1 may include a plated layer that is directly electrically connected to the first internal electrode 31 and the second internal electrode 32. In such a case, the plated layer may be provided after a catalyst is disposed on the surface of the multilayer body 10 as a pretreatment.

Also in this case, it is preferable that the plated layer include a plurality of layers. It is preferable that a lower plated layer and an upper plated layer respectively include at least one metal selected from, for example, Cu, Ni, Sn, Pb, Au, Ag, Pd, Bi, or Zn, or an alloy including these metals. The lower plated layer is more preferably provided using Ni which has a solder barrier performance. The upper plated layer is more preferably provided using Sn or Au having good solder wettability. For example, when the first internal electrodes 31 and the second internal electrodes 32 are provided using Ni, it is preferable that the lower plated layer is provided using Cu which has a good bonding property with Ni. The upper plated layer may be provided as necessary, and the external electrodes 40 may include only the lower plated layer. Furthermore, the upper plated layer may define and function as the outermost layer, or another plated layer may be further provided on the surface of the upper plated layer.

The thickness per layer of the plated layers to be provided without providing a base electrode layer is preferably about 1 µm or more and about 15 µm or less, for example. The plated layer preferably does not include glass. The metal ratio per unit volume of the plated layer is preferably about 99% by volume or more, for example.

When directly providing the plated layer on the multilayer body 10, it is possible to reduce the thickness of the base electrode layer. Therefore, the reduction in the thickness of the base electrode layer leads to the reduction in the dimension in the height direction T of the multilayer ceramic capacitor 1, such that it is possible to reduce the height of the multilayer ceramic capacitor 1. Alternatively, by reducing the thickness of the base electrode layer, and increasing the thickness of the dielectric layers 20 sandwiched between the first internal electrode 31 and the second internal electrodes 32 by the amount of the reduction instead, it is possible to improve the thickness of a base body. Thus, by providing the plated layer directly on the multilayer body 10, it is possible to improve the degrees of freedom in design of the multilayer ceramic capacitor.

When the dimension in the length direction of the multilayer ceramic capacitor 1 including the multilayer body 10 and the external electrode 40 is defined as the L dimension, the L dimension is preferably about 0.4 mm or more and about 3.2 mm or less, for example. Furthermore, when the dimension of the multilayer ceramic capacitor 1 in the lamination direction is defined as T, T is preferably about 0.2 mm or more and about 2.5 mm or less, for example. Furthermore, when the dimension in the width direction of the multilayer ceramic capacitor 1 is defined as W, W is preferably about 0.2 mm or more and about 2.5 mm or less, for example.

As described above, the multilayer ceramic capacitor 1 according to the present preferred embodiment is directed to a multilayer ceramic capacitor 1 including a multilayer body 10 including a plurality of laminated dielectric layers 20 and a plurality of laminated internal electrodes 30, the multilayer body 10 further including a first main surface TS1 and a second main surface TS2 that are opposed to each other in a height direction, a first side surface WS1 and a second side surface WS2 that are opposed to each other in a width direction perpendicular or substantially perpendicular to the height direction, and a first end surface LS1 and a second end surface LS2 that are opposed to each other in a length direction perpendicular or substantially perpendicular to the height direction and the width direction, and external electrodes 40. In the multilayer ceramic capacitor 1, the plurality of laminated internal electrodes 30 each include a first internal electrode 31 provided on the first dielectric layer and extending to the first end surface LS1, and a second internal electrode 32 provided on the second dielectric layer 20 and extending to the second end surface LS2, the external electrodes 40 include a first external electrode 40A connected to the first internal electrode 31 and provided on the first end surface LS1, and a second external electrode 40B connected to the second internal electrode 32 and provided on the second end surface LS2, the first internal electrode 31 includes a first lower coverage portion 31A (a first outer peripheral portion 31A) provided in an outer peripheral region of the first internal electrode and a first high coverage portion (the first inner electrode portion 31B) provided inside the first low coverage portion 31A, the second internal electrode 32 includes a second lower coverage portion (a second outer peripheral portion 32A) provided in an outer peripheral region of the second internal electrode 32 and a second high coverage portion (the second inner electrode portion 32B) provided inside the second low coverage portion 32A, and the dielectric layer 20 includes the high dielectric constant portions 21A and 22A a portion of which is provided at a location sandwiched by the first low coverage portion 31A and the second low coverage portion 32A, and the low dielectric constant portions 21B and 22B provided inside the high dielectric constant portion. This makes it possible to maintain a high capacitance and ensure a high reliability.

More specifically, a multilayer ceramic capacitor 1 according to a preferred embodiment of the present invention includes a multilayer body 10 including a plurality of laminated dielectric layers 20 and a plurality of laminated internal electrodes 30, the multilayer body 10 further including a first main surface TS1 and a second main surface TS2 that are opposed to each other in a height direction, a first side surface WS1 and a second side surface WS2 that are opposed to each other in a width direction perpendicular or substantially perpendicular to the height direction, and a first end surface LS1 and a second end surface LS2 that are opposed to each other in a length direction perpendicular or substantially perpendicular to the height direction and the width direction, and external electrodes 40. In the multilayer ceramic capacitor 1, the plurality of laminated dielectric layers 20 each include a first dielectric layer 21 and a second dielectric layer 22, the plurality of laminated internal electrodes 30 each include a first internal electrode 31 provided on the first dielectric layer 21 and extending to the first end surface LS1, and a second internal electrode 32 provided on the second dielectric layer 22 and extending to the second end surface LS2, the external electrodes 40 include a first external electrode 40A connected to the first internal electrode 31 and provided on the first end surface LS1, and a second external electrode 40B connected to the second internal electrode 32 and provided on the second end surface LS2, the first internal electrode 31 includes four sides E1, E2, E3, and E4, and further includes a first outer peripheral portion 31A in a vicinity of three sides E1, E2, and E3 other than one side E4 extending to the first end surface LS1, and a first inner electrode portion 31B provided inside the first outer peripheral portion 31A, the second internal electrode 32 includes four sides E5, E6, E7, and E8, and further includes a second outer peripheral portion 32A in a vicinity of three sides E5, E6, and E7 other than one side E8 extending to the second end surface LS2, and a second inner electrode portion 32B provided inside the second outer peripheral portion 32A, when a coverage of the first internal electrode 31 relative to the first dielectric layer 321 in the first outer peripheral portion 31A is defined as A1, and a coverage of the first internal electrode 31 relative to the first dielectric layer 21 in the first inner electrode portion 31B is defined as B1, a relationship of A1<B1 is satisfied, when a coverage of the second internal electrode 32 relative to the second dielectric layer 22 in the second outer peripheral portion 32A is defined as A2, and a coverage of the second internal electrode 32 relative to the second dielectric layer 22 in the second inner electrode portion 32B is defined as B2, a relationship of A2<B2 is satisfied, the first dielectric layer 21 includes four sides F1, F2, F3, and F4 in a region in which the first internal electrode 31 is provided, and further includes a first high dielectric constant portion 21A in a vicinity of three sides F1, F2, and F3 other than one side F4 located at the first end surface LS1, and a first inner dielectric layer portion 21B located inside the first high dielectric constant portion 21A, the second dielectric layer 22 includes four sides F5, F6, F7, and F8 in a region in which the second internal electrode 32 is provided, and further includes a second high dielectric constant portion 22A in a vicinity of three sides F5, F6, and F7 other than one side F8 located at the second end surface LS2, and a second inner dielectric layer portion 22B located inside the second high dielectric constant portion 22A, when a relative dielectric constant of the first dielectric layer 21 in the first high dielectric constant portion 21A is defined as A3, and a relative dielectric constant of the first dielectric layer 21 in the first inner dielectric layer portion 21B is defined as B3, a relationship of A3>B3 is satisfied, when a relative dielectric constant of the second dielectric layer 22 in the second high dielectric constant portion 22A is defined as A4, and a relative dielectric constant of the second dielectric layer 22 in the second inner dielectric layer portion 22B is defined as B4, a relationship of A4>B4 is satisfied, and a covering ratio of the first high dielectric constant portion 21A relative to the first outer peripheral portion 31A, and a covering ratio of the second high dielectric constant portion 22A relative to the second outer peripheral portion 32A are, for example, about 68% or more and about 187% or less. This makes it possible to maintain a high capacitance and ensure a high reliability.

Next, a non-limiting example of a method of manufacturing the multilayer ceramic capacitor 1 of the present preferred embodiment will be described. First, a non-limiting example of a method of manufacturing the multilayer ceramic capacitor 1 will be described.

A dielectric sheet for the dielectric layer 20 and a conductive paste for the internal electrode 30 are provided. The conductive paste for the dielectric sheet and the internal electrode includes a binder and a solvent. Known binders and solvents may be used.

First, $BaTiO_3$ powder, which is a main component of a dielectric, is prepared. Specifically, predetermined amounts of $BaCO_3$ powder and $TiO_2$ powder are weighed, mixed by a ball mill for a predetermined period, and then subjected to heat treatment to obtain a $BaTiO_3$ powder as a main component.

Next, the respective powders of $Dy_2O_3$, MgO, MnO, and $SiO_2$, which are sub-components of the dielectric are prepared.

Weighing is performed so that $Dy_2O_3$ is, for example, about 0.75 parts by mol, MgO is 1 part by mol, MnO is about 0.2 parts by mol, and $SiO_2$ is about 1 part by mol with respect to 100 parts by mol of the main component. These powders are blended with BT powder ($BaTiO_3$ powder) of the main component, mixed for a predetermined period by a ball mill, dried, and dry pulverized to obtain a low relative dielectric constant raw material powder. A polyvinyl butyral-based binder and an organic solvent such as ethanol, for example, is added to this low relative dielectric constant raw material powder, and wet mixing by a ball mill is performed to adjust the low relative dielectric constant dielectric slurry.

Next, weighing is performed so that $Dy_2O_3$ is, for example, about 0.25 parts by mol, MgO is about 1 part by mol, MnO is about 0.2 parts by mol, and $SiO_2$ is about 1 part by mol with respect to 100 parts by mol of the main component. These powders are blended with BT powder of the main component, mixed for a predetermined period by a ball mill, dried, and dry pulverized to obtain a high relative dielectric constant raw material powder. A polyvinyl butyral-based binder and an organic solvent such as ethanol, for example, is added to this high relative dielectric constant raw material powder, and wet mixing by a ball mill is performed to adjust the high relative dielectric constant dielectric slurry.

A dielectric slurry for use in the portions defining and functioning as the W gap (a portion serving as the first side surface-side outer layer portion WG1 and the second side surface-side outer layer portion WG2) and the L gap (a portion serving as the first end surface-side outer layer portion LG1 and the second end surface-side outer layer portion LG2) of the dielectric layers 20 can be used by selecting from among a low relative dielectric constant dielectric slurry, a high relative dielectric constant dielectric slurry, and a slurry expressing an intermediate relative dielectric constant between them. Hereinafter, a non-limiting example of a manufacturing method of the dielectric sheet in a case where each slurry is used will be described.

The portions defining and functioning as the W gap and the L gap of the dielectric layers 20 when firing is performed such that the multilayer body 10 is formed refer to, more specifically, the first outer dielectric layer portion 21C of the first dielectric layers 21 (the first side surface-side outer layer portion WG1, the second side surface-side outer layer portion WG2, and the second end surface-side outer layer portion LG2), and the second outer dielectric layer portion 22C of the second dielectric layer 22 (the first side-surface side outer layer portion WG1, the second side surface-side outer layer portion WG2, and the first end surface-side outer layer portion LG1). Furthermore, the portion defining and functioning as the inner dielectric layer portion of the dielectric layers 20 when firing is performed such that the multilayer body 10 is formed refers to the first inner dielectric layer portion 21B of the first dielectric layers 21 and the second inner dielectric layer portion 22B of the second dielectric layer 22. Furthermore, the portion defining and functioning as a high dielectric constant portion of the dielectric layers 20 when firing is performed such that the multilayer body 10 is formed refers to the first high dielectric constant portion 21A of the first dielectric layer 21 and the second high dielectric constant portion 22A of the second dielectric layer 22.

When using a low dielectric constant slurry in the portions defining and functioning as the L gap and the W gap, the low relative dielectric constant dielectric slurry is applied by, for example, a screen coating or an ink jet method to the region defining and functioning as the inner dielectric layer portion, the W gap portion, and the L gap portion (the first side surface-side outer layer portion, the second side surface-side outer layer portion, the first end surface-side outer layer portion, and the second end surface-side outer layer portion). Then, the high relative dielectric constant dielectric slurry is applied to the region defining and functioning as the high dielectric constant portion by a screen coating or an ink jet method, for example.

When using a high dielectric constant slurry in the L gap and the W gap, a low relative dielectric constant dielectric slurry is applied by, for example, a screen coating or an ink jet method to the region defining and functioning as the inner dielectric layer portion. Then, a high relative dielectric constant dielectric slurry is applied to the region defining and functioning as a high dielectric constant portion, the W gap portion, and the L gap portion (the first side surface-side outer layer portion, the second side surface-side outer layer portion, the first end surface-side outer layer portion, and the second end surface-side outer layer portion) by, for example, a screen coating or an ink jet method.

When using an intermediate relative dielectric constant dielectric slurry for the portion defining and functioning as the L gap and the W gap, the intermediate relative dielectric constant dielectric slurry is adjusted in the following manner. First, weighing is performed, for example, so that $Dy_2O_3$ is about 0.50 parts by mol, MgO is about 1 part by mol, MnO is about 0.2 parts by mol, and $SiO_2$ is about 1 part by mol with respect to 100 parts by mol of the main component. These powders are blended with BT powder of the main component, mixed for a predetermined period by a ball mill, dried, and dry pulverized to obtain an intermediate relative dielectric constant raw material powder. A polyvinyl butyral-based binder and an organic solvent such as ethanol, for example, is added to this intermediate relative dielectric constant raw material powder, and wet mixing by a ball mill is performed to adjust the intermediate relative dielectric constant dielectric slurry. Then, the low relative dielectric constant dielectric slurry is applied to the region defining and functioning as the inner dielectric layer portion by, for example, a screen coating or an ink jet method. Furthermore, the high relative dielectric constant dielectric slurry is applied to the region defining and functioning as the high dielectric constant portion by, for example, a screen coating or an ink jet method. Furthermore, the intermediate relative dielectric constant dielectric slurry is applied to the regions defining and functioning as the W gap and the L gap (the first side surface-side outer layer portion, the second side surface-side outer layer portion, the first end surface-side outer layer portion, and the second end surface-side outer layer portion) by, for example, a screen coating or an inkjet method.

The dielectric sheet defining and functioning as the first dielectric layer 21 and the dielectric sheet defining and functioning as the second dielectric layer 22 are thus prepared.

On the dielectric sheet defining and functioning as the first dielectric layer 21, the conductive paste for the internal electrode 30 is printed in a predetermined pattern corresponding to the first internal electrode 31, for example, by screen printing or gravure printing. On the dielectric sheet serving as the second dielectric layer 22, the conductive paste for the internal electrode 30 is printed in a predetermined pattern corresponding to the second internal electrode 32, for example, by screen printing or gravure printing. The dielectric sheet in which the pattern of the first internal electrode 31 is formed, and the dielectric sheet in which the pattern of the second internal electrode 32 is formed are thus prepared. At this time, the viscosity of the conductive paste for the internal electrode is preferably about 50 mPa·s to about 600 mPa·s, for example. As a result, the coverage of the internal electrode of the present preferred embodiment can be achieved. Furthermore, by making the opening area corresponding to the first outer peripheral portion 31A and the second outer peripheral portion 32A of a screen printing plate or a gravure printing plate, for example, smaller than the opening area corresponding to the first inner electrode portion 31B and the second inner electrode portion 32B, it is easier to control the coverage of the internal electrode of the present preferred embodiment.

By a predetermined number of dielectric sheets in which the pattern of the internal electrode is not printed being laminated, a portion defining and functioning as the first main surface-side outer layer portion 12 in the vicinity of the first main surface TS1 is formed. On top of that, the dielectric sheets defining and functioning as the first dielectric layer 21 in which the pattern of the first internal electrode 31 is printed, and the dielectric sheets defining and functioning as the second dielectric layer 22 in which the pattern of the second internal electrode 32 is printed are sequentially laminated, such that a portion defining and functioning as the inner layer portion 11 is formed. On this portion defining and functioning as the inner layer portion 11, a predetermined number of dielectric sheets in which the pattern of the internal electrode is not printed are laminated, such that a portion defining and functioning as the second main surface-side outer layer portion 13 in the vicinity of the second main surface TS2 is formed. A laminated sheet is thus produced.

The laminated sheet is pressed in the lamination direction by hydrostatic pressing, for example, such that a laminated block is produced.

The laminated block is cut to a predetermined size, such that laminate chips are cut out. At this time, corners and ridges of the laminate chip may be rounded by barrel polishing or the like.

The laminate chip is fired to produce the multilayer body 10. The firing temperature depends on the materials of the dielectric layers 20 and the internal electrodes 30, but is preferably about 900° C. or more and about 1400° C. or less, for example.

The conductive pastes defining and functioning as base electrode layers (the first base electrode layer 50A and the second base electrode layer 50B) are applied to both end surfaces of the multilayer body 10. In the present preferred embodiment, the base electrode layers are fired layers. A conductive paste including, for example, a glass component and metal is applied to the multilayer body 10 by, for example, a method such as dipping. Thereafter, a firing process is performed to form the base electrode layers. The temperature of the firing process at this time is preferably about 700° C. or higher and about 900° C. or lower, for example.

In a case in which the laminate chip before firing and the conductive paste applied to the laminate chip are fired simultaneously, it is preferable that the fired layer is formed by firing a layer to which a ceramic material is added, instead of a glass component. At this time, it is particularly preferable to use, as the ceramic material to be added, the same type of ceramic material as the dielectric layer 20. In this case, a conductive paste is applied to the laminate chip before firing, and the laminate chip and the conductive paste applied to the laminated chip are fired simultaneously, such that the multilayer body 10 having a fired layer formed therein is formed.

Thereafter, the plated layer is formed on the surface of the base electrode layer. In the present preferred embodiment, the first plated layer 70A is formed on the first base electrode layer 50A. Furthermore, a second plated layer 70B is formed on the second base electrode layer 50B. In the present preferred embodiment, as the plated layer, for example, the Ni plated layer and the Sn plated layer are provided. Upon performing the plating process, electrolytic plating or electroless plating may be used. However, the electroless plating has a disadvantage in that a pretreatment with a catalyst or the like is necessary in order to improve the plating deposition rate, and thus the process becomes complicated. Therefore, normally, electrolytic plating is preferably used. The Ni plated layer and the Sn plated layer are sequentially formed, for example, by barrel plating.

In a case in which the base electrode layer is formed with a thin film layer, such a thin film layer as the base electrode layer is formed at a portion where the external electrode is desired to be formed by performing masking or the like. The thin film layer is formed by a thin film forming method, such as a sputtering method or deposition method, for example. The thin film layer has a thickness of, for example, about 1 μm or less on which metal particles are deposited.

When the conductive resin layer is provided as the base electrode layer, the conductive resin layer may be provided so as to cover the fired layer, or may be provided directly on the multilayer body 10 without providing the fired layer. When the conductive resin layer is provided, a conductive resin paste including, for example, a thermosetting resin and a metal component is applied onto the fired layer or the multilayer body 10, and then heat-treated at a temperature of, for example, about 250° C. to about 550° C. or higher. As a result, the thermosetting resin is thermally cured to form a conductive resin layer. The atmosphere at the time of this heat treatment is preferably an N2 atmosphere, for example. Furthermore, in order to prevent scattering of the resin and to prevent oxidation of various metal components, the oxygen concentration is preferably about 100 ppm or less, for example.

It should be noted that the plated layer may be provided directly on the exposed portion of the internal electrode 30 of the multilayer body 10 without providing the base electrode layer. In this case, the plating process is applied to the first end surface LS1 and the second end surface LS2 of the multilayer body 10, such that the plated layer is formed on the exposed portion of the internal electrode 30. Upon performing the plating process, electrolytic plating or electroless plating may be used. However, the electroless plating has a disadvantage in that a pretreatment with a catalyst or the like is necessary in order to improve the plating deposition rate, and thus the process becomes complicated. Therefore, normally, electrolytic plating is preferably used. As the plating method, it is preferable to us barrel plating. Furthermore, the upper plated layer formed on the surface of the lower plated layer may be formed by the same method as the lower plated layer as necessary.

By such a non-limiting example manufacturing process, the multilayer ceramic capacitor 1 is manufactured.

Figure 8:
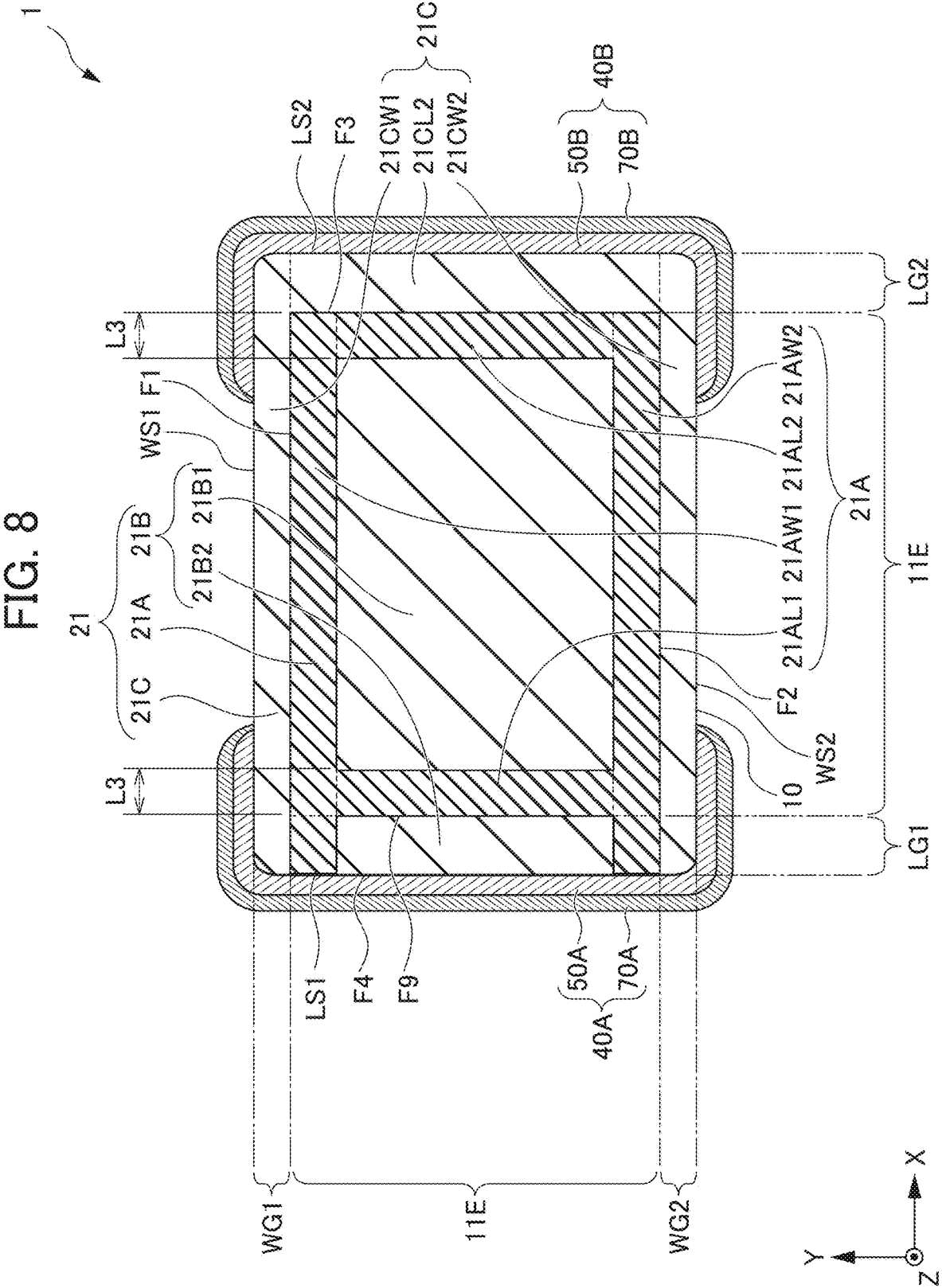
FIG. 8 is a cross-sectional view of a multilayer ceramic capacitor according to a first modified example of the above-described preferred embodiment of the present invention, and is a cross-sectional view corresponding to FIG. 5 of the above-described preferred embodiment of the present invention.
Figure 9:
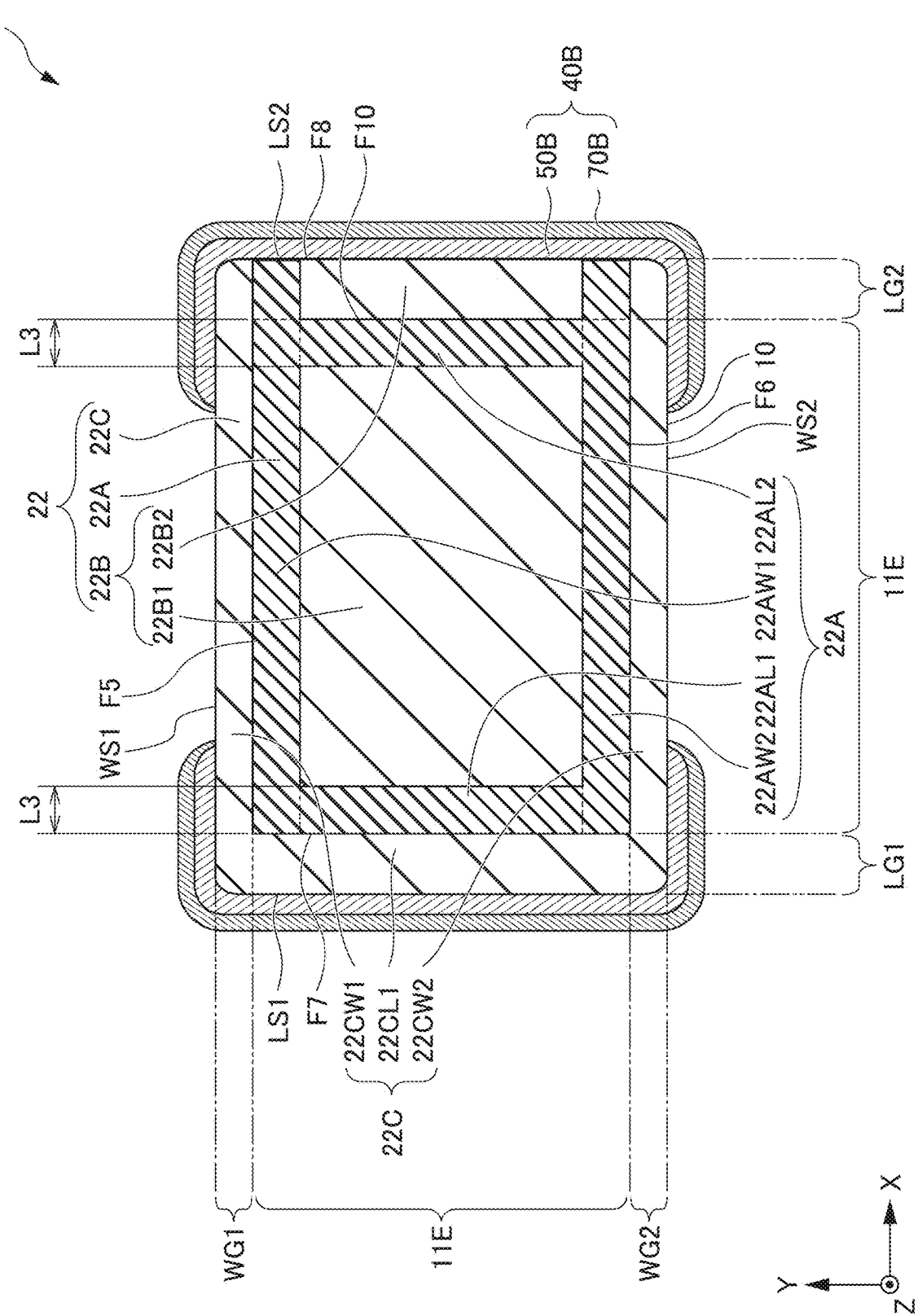
FIG. 9 is a cross-sectional view of the multilayer ceramic capacitor according to the above-described first modified example, and is a cross-sectional view corresponding to FIG. 7 of the above-described preferred embodiment of the present invention.

Hereinafter, a first modified example of the multilayer ceramic capacitor 1 of the present preferred embodiment will be described. In the following, the same or corresponding components as those of the above-described preferred embodiment are denoted by the same reference numerals, and the detailed descriptions thereof are omitted. FIG. 8 is a cross-sectional view showing a first modified example of the multilayer ceramic capacitor 1 of the present preferred embodiment, and corresponding to FIG. 5. FIG. 9 is a cross-sectional view showing the first modified example of the multilayer ceramic capacitor 1 of the present preferred embodiment, and corresponding to FIG. 7.

In the present modified example, the first high dielectric constant portion 21A and the second high dielectric constant portion 22A differ from those of the above-described preferred embodiment.

In the present modified example, as shown in FIG. 8, the first high dielectric constant portion 21A includes a first end surface-side region 21AL1, in addition to the first side surface-side region 21AW1, the second side surface-side region 21AW2, and the second end surface-side region 21AL2. The first end surface-side region 21AL1 is provided in the vicinity of the ninth side F9 which is a side in the vicinity of a first end portion of the counter electrode portion 11E in the first dielectric layers 21.

The ninth side F9 of the first dielectric layers 21 is a border between the counter electrode portion 11E and the first end surface-side outer layer portion LG1. When viewed in the lamination direction, the ninth side F9 of the first dielectric layers 21 overlaps the border of the first opposing portion 311 and the first lead-out portion 312 of the first internal electrodes 31. When viewed in the lamination direction, the ninth side F9 of the first dielectric layers 21 overlaps the seventh side E7 defining the outer edge of the second internal electrodes 32. That is, the first side F1 to the third side F3, and the ninth side F9 of the first dielectric layers 21 in the present modified example are imaginary lines surrounding the periphery of the counter electrode portion 11E in the first dielectric layers 21. Then, in the present modified example, the ninth side F9 of the first dielectric layers 21 defines an outer edge portion of the first high dielectric constant portion 21A. In the present modified example, the first inner dielectric layer portion 21B is separated into a region 21B1 and a region 21B2 by the first end surface-side region 21AL1.

A length L3 in the length direction connecting the first end surface LS1 and the second end surface LS2 of the first end surface-side region 21AL1 of the first high dielectric constant portion 21A is preferably, for example, about 5% or more and about 20% or less of a length L1 connecting the fourth side E4 in the vicinity of the first end surface LS1 and the third side E3 in the vicinity of the second end surface LS2 of the first internal electrodes 31.

Thus, the second low-coverage portion 32A (the second outer peripheral portion 32A) of the second internal electrodes 32 can be sandwiched by the first high dielectric constant portion 21A of the first dielectric layer 21 and the second high dielectric constant portion 22A of the second dielectric layer 22. Therefore, it is possible to maintain a higher capacitance.

In the present modified example, as shown in FIG. 9, the second high dielectric constant portion 22A includes a second end surface-side region 22AL2, in addition to the first side surface-side region 22AW1, the second side surface-side region 22AW2, and the first end surface-side region 22AL1. The second end surface-side region 22AL2 is provided in the vicinity of the tenth side F10 which is a side in the vicinity of a second end portion of the counter electrode portion 11E in the second dielectric layers 22.

The tenth side F10 of the second dielectric layers 22 is a border between the counter electrode portion 11E and the second end surface-side outer layer portion LG2. When viewed in the lamination direction, the tenth side F10 of the second dielectric layers 22 overlaps the border of the second opposing portion 321 and the second lead-out portion 322 of the second internal electrodes 32. When viewed in the lamination direction, the tenth side F10 of the second dielectric layers 22 overlaps the third side E3 defining the outer edge of the first internal electrodes 31. That is, the fifth side F5 to the seventh side F7, and the tenth side F10 of the second dielectric layers 22 in the present modified example are imaginary lines surrounding the periphery of the counter electrode portion 11E in the second dielectric layers 22. Then, in the present modified example, the tenth side F10 of the second dielectric layers 22 defines an outer edge portion of the second high dielectric constant portion 22A. In the present modified example, the second inner dielectric layer portion 22B is separated into a region 22B1 and a region 22B2 by the second end surface-side region 22AL2.

A length L3 in the length direction connecting the first end surface LS1 and the second end surface LS2 of the second end surface-side region 22AL2 of the second high dielectric constant portion 22A is preferably, for example, about 5% or more and about 20% or less of a length L1 connecting the eighth side E8 in the vicinity of the first end surface LS1 and the seventh side E7 in the vicinity of the second end surface LS2 of the second internal electrodes 32.

Thus, the first low coverage portion 31A (the first outer peripheral portion 31A) of the first internal electrodes 31 can be sandwiched by the first high dielectric constant portion 21A of the first dielectric layer 21 and the second high dielectric constant portion 22A of the second dielectric layer 22, and it is possible to maintain a higher capacitance.

Figure 10:
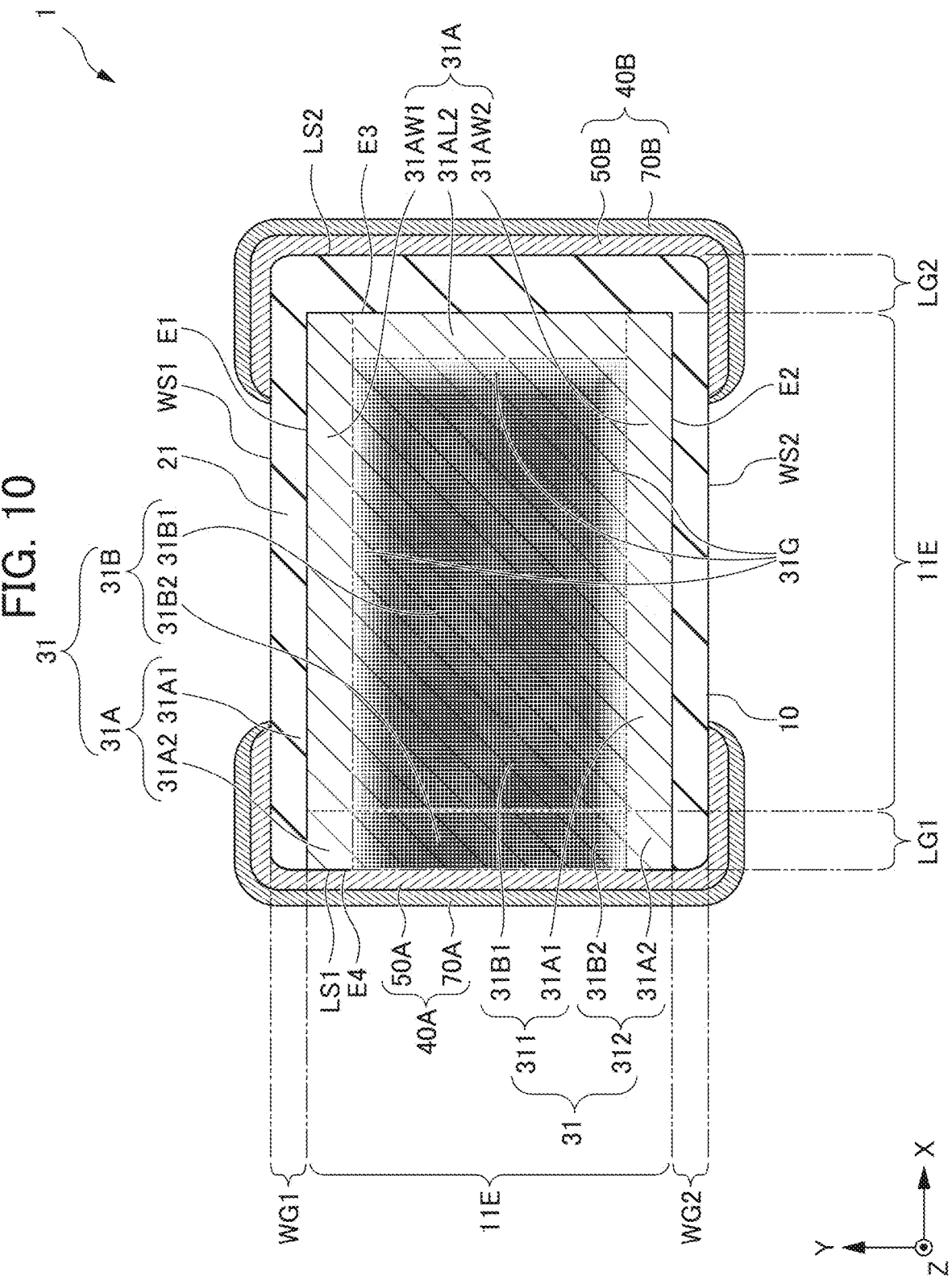
FIG. 10 is a cross-sectional view of a multilayer ceramic capacitor according to a second modified example of the above-described preferred embodiment of the present invention, and is a cross-sectional view corresponding to FIG. 4 of the above-described preferred embodiment of the present invention.
Figure 11:
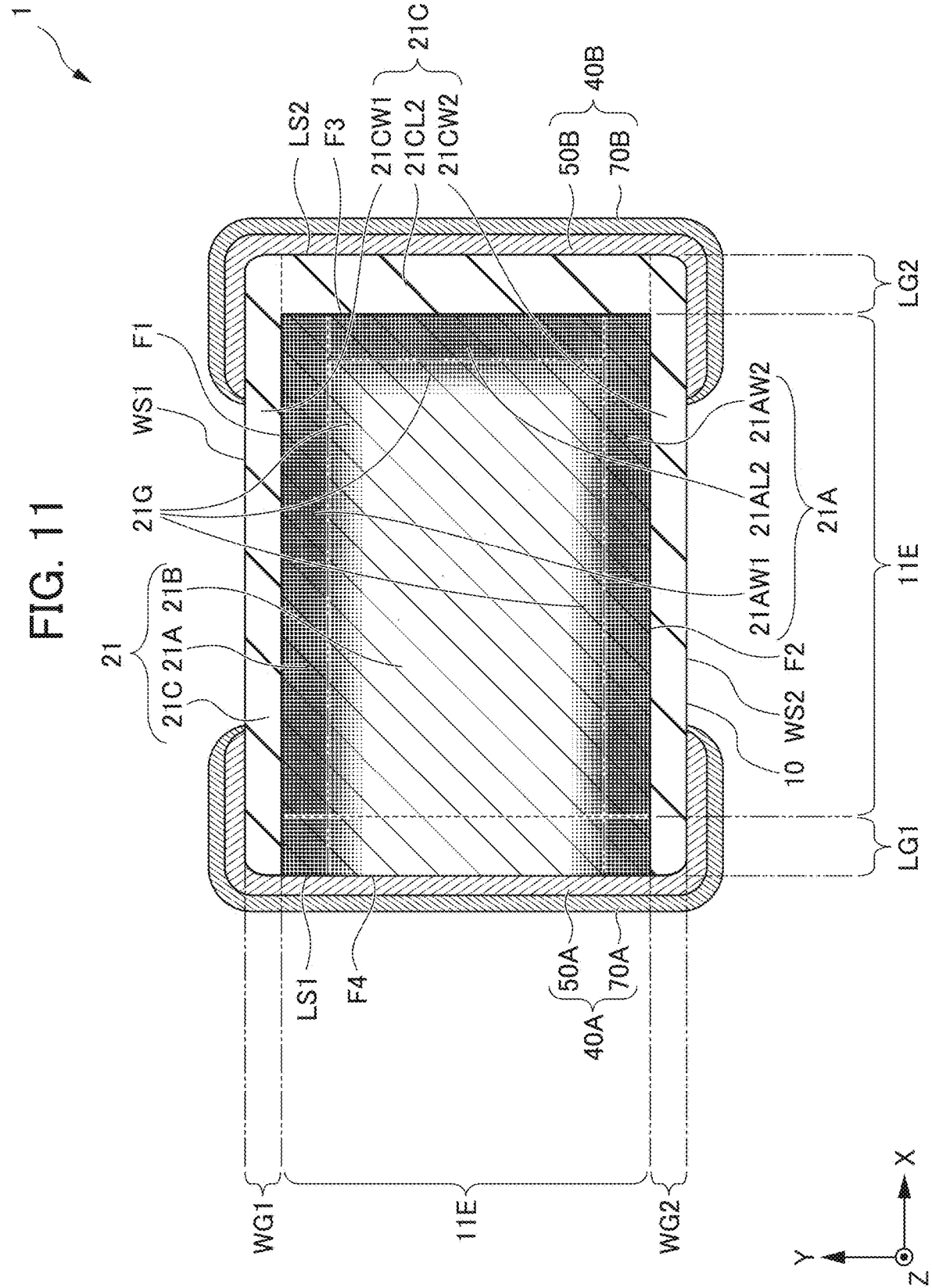
FIG. 11 is a cross-sectional view of the multilayer ceramic capacitor according to the above-described second modified example of a preferred embodiment of the present invention, and is a cross-sectional view corresponding to FIG. 5 of the above-described preferred embodiment of the present invention.

Hereinafter, a second modified example of the multilayer ceramic capacitor 1 of the present preferred embodiment will be described. In the following description, the same or corresponding components as those of the above preferred embodiment are denoted by the same reference numerals, and the detailed descriptions thereof are omitted. FIG. 10 is a cross-sectional view showing a second modified example of the multilayer ceramic capacitor 1 of the present preferred embodiment, and corresponding to FIG. 4. FIG. 11 is a cross-sectional view showing a second modified example of the multilayer ceramic capacitor 1 of the present preferred embodiment, and corresponding to FIG. 5.

In the present modified example, the internal electrodes 30 and the dielectric layers 20 differ from those of the above-described preferred embodiment.

In the present modified example, as shown in FIG. 10, in the first internal electrode 31, the coverage of the first internal electrodes 31 relative to the first dielectric layer 21 is reduced as it approaches the first outer peripheral portion 31A from the middle portion. That is, the first internal electrode 31 includes a coverage transition portion 31G between the first inner electrode portion 31B and the first outer peripheral portion 31A, and the coverage gradually changes in this portion. Furthermore, although not shown, similarly to the second internal electrode 32, the coverage of the second internal electrode 32 relative to the second dielectric layer 22 is reduced as it approaches the second outer peripheral portion 32A from the middle portion. That is, the second internal electrode 32 includes a coverage transition portion between the second inner electrode portion 32B and the second outer peripheral portion 32A, and the coverage gradually changes in this portion.

Then, as shown in FIG. 11, the first dielectric layers 21 has a higher relative dielectric constant as it approaches the first high dielectric constant portion 21A corresponding to the first outer peripheral portion 31A from the middle portion. That is, the first dielectric layers 21 each include a relative dielectric constant transition portion 21G between the first inner dielectric layer portion 21B and the first high dielectric constant portion 21A, and the relative dielectric constant gradually changes in this portion. Furthermore, although not shown, similarly to the second dielectric layer 22, the relative dielectric constant increases as it approaches the second high dielectric constant portion 22A corresponding to the second outer peripheral portion 32A from the middle portion. That is, the second dielectric layer 22 includes a relative dielectric constant transition portion between the second inner dielectric layer portion 22B and the second high dielectric constant portion 22A, and the relative dielectric constant gradually changes in this portion.

Thus, even when lamination misalignment occurs when laminating the dielectric layer 20, it is possible to reduce or prevent a decrease in capacitance caused by the portion in which the relative dielectric constant of the dielectric layer 20 is low overlapping the portion in which the coverage of the internal electrode 30 is low.

According to the multilayer ceramic capacitor 1 of the present preferred embodiment, the following advantageous effects are achieved.

(1) The multilayer ceramic capacitor 1 according to the present preferred embodiment includes a multilayer body 10 including a plurality of laminated dielectric layers 20 and a plurality of laminated internal electrodes 30, the multilayer body 10 further including a first main surface TS1 and a second main surface TS2 that are opposed to each other in a height direction, a first side surface WS1 and a second side surface WS2 that are opposed to each other in a width direction perpendicular or substantially perpendicular to the height direction, and a first end surface LS1 and a second end surface LS2 that are opposed to each other in a length direction perpendicular or substantially perpendicular to the height direction and the width direction; and external electrodes 40. In the multilayer ceramic capacitor 1, the plurality of laminated internal electrodes 30 each include a first internal electrode 31 provided on the first dielectric layer and extending to the first end surface LS1, and a second internal electrode 32 provided on the second dielectric layer 20 and extending to the second end surface LS2, the external electrodes 40 include a first external electrode 40A connected to the first internal electrode 31 and provided on the first end surface LS1, and a second external electrode 40B connected to the second internal electrode 32 and provided on the second end surface LS2, the first internal electrode 31 includes a first lower coverage portion 31A (a first outer peripheral portion 31A) provided in an outer peripheral region of the first internal electrode and a first high coverage portion (the first inner electrode portion 31B) provided inside the first low coverage portion 31A, the second internal electrode 32 includes a second lower coverage portion (a second outer peripheral portion 32A) provided in an outer peripheral region of the second internal electrode 32 and a second high coverage portion (the second inner electrode portion 32B) provided inside the second low coverage portion 32A, and the dielectric layer 20 includes the high dielectric constant portions 21A and 22A a portion of which is provided at a location sandwiched by the first low coverage portion 31A and the second low coverage portion 32A, and the low dielectric constant portions 21B and 22B provided inside the high dielectric constant portion. This makes it possible to maintain a high capacitance and ensure a high reliability.

(2) In the multilayer ceramic capacitor 1 according to the present preferred embodiment, a length L2 in a length direction L connecting the first end surface LS1 and the second end surface LS2 of a side E3, which is located in the vicinity of the second end surface LS2, of the first outer peripheral portion 31A is about 5% or more and about 10% or less of a length L1 in the length direction L connecting the first end surface LS1 and the second end surface LS2 of the first internal electrode 31. As a result, the advantageous effects of the present preferred embodiment can be further improved.

(3) In the multilayer ceramic capacitor 1 according to the present preferred embodiment, a length L2 in a length direction L connecting the first end surface LS1 and the second end surface LS2 of a side E7, which is located in the vicinity of the first end surface LS1, of the second outer peripheral portion 32A is about 5% or more and about 10% or less of a length L2 in the length direction L connecting the first end surface LS1 and the second end surface LS2 of the second internal electrode 32. As a result, the advantageous effects of the present preferred embodiment can be further improved.

(4) In the multilayer ceramic capacitor 1 according to the present preferred embodiment, a length W2 in a width direction W connecting the first side surface WS1 and the second side surface WS2, of a portion in a vicinity of a side E1 in the vicinity of the first side surface WS1 (the first side surface-side region 31AW1) and a portion in a vicinity of a side E2 in the vicinity of the second side surface WS2 (the second side surface-side region 31AW2) of the first outer peripheral portion 31A is about 5% or more and about 20% or less of a length W1 in the width direction W connecting the first side surface WS1 and the second side surface WS2 of the first internal electrode 31. As a result, the advantageous effects of the present preferred embodiment can be further improved.

(5) In the multilayer ceramic capacitor 1 according to the present preferred embodiment, a length W2 in a width direction W connecting the first side surface WS1 and the second side surface WS2, of a portion in a vicinity of a side E5 in the vicinity of the first side surface WS1 (the first side surface-side region 32AW1) and a portion in a vicinity of a side E6 in the vicinity of the second side surface WS2 (the second side surface-side region 32AW2) of the second outer peripheral portion 32A is about 5% or more and about 20% or less of a length W1 in the width direction W connecting the first side surface WS1 and the second side surface WS2 of the second internal electrode 32. As a result, the advantageous effects of the present preferred embodiment can be further improved.

(6) In the multilayer ceramic capacitor 1 according to the present preferred embodiment, the first dielectric layer 21 in a portion in which the first internal electrode 31 is located has a higher relative dielectric constant as approaching a portion corresponding to the first outer peripheral portion 31A from a middle portion of the first dielectric layer 21, and the second dielectric layer 22 in a portion in which the second internal electrode 32 is located has a higher relative dielectric constant as approaching a portion corresponding to the second outer peripheral portion 32A from a middle portion of the second dielectric layer 22. Thus, even when lamination misalignment occurs when laminating the dielectric layer 20, it is possible to reduce or prevent a decrease in capacitance caused by the portion in which the relative dielectric constant of the dielectric layer 20 is low overlapping the portion in which the coverage of the internal electrode 30 is low.

Experimental Examples

Figure 12:
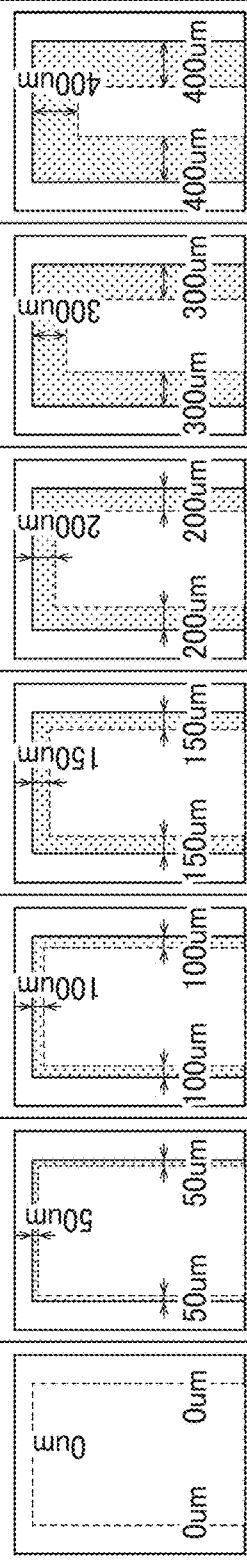
FIG. 12 is a table showing the results of capacitance measurement and reliability testing when the covering ratio in the experimental examples is changed.

According to the above-described non-limiting example of a manufacturing method, a multilayer ceramic capacitor of the experimental example shown in FIG. 12 was manufactured, and the measurement of the capacitance and the test of the reliability were performed. FIG. 12 provides schematic diagrams each showing the shape of an internal electrode in the experimental examples.

First, in order to produce samples of the experimental examples, multilayer ceramic capacitors having the following specifications were produced in accordance with the above-described manufacturing method.

Dimensions of multilayer ceramic capacitors: L×W×T=about 2.2 mm×about 1.4 mm×about 0.8 mm
Dielectric layer: $BaTiO_3$
Relative dielectric constant A3 of the first dielectric layer in the first high dielectric constant portion: about 3800
Relative dielectric constant B3 of the first dielectric layer in the first inner dielectric layer portion: about 3000
Relative dielectric constant A4 of the second dielectric layer in the second high dielectric constant portion: about 3800
Relative dielectric constant B4 of the second dielectric layer in the second inner dielectric layer portion: about 3000
Material of internal electrode: Ni
Dimension of distance W1: about 1200 μm
Dimension of distance W2: about 150 μm
Dimension of distance L1: about 1920 μm
Dimension of distance L2: about 150 μm
Coverage A1 of the first internal electrode relative to the first dielectric layer in the first outer peripheral portion: about 70%
Coverage B1 of the first inner electrode relative to the first dielectric layer at the first internal electrode portion: about 95%
Coverage A2 of the second internal electrode relative to the second dielectric layer in the second outer peripheral portion: about 70%
Coverage B2 of the second internal electrode relative to the second dielectric layer in the second inner electrode portion: about 95%
Covering ratio (the covering ratio of the first high dielectric constant portion relative to the first outer peripheral portion and the covering ratio of the second high dielectric constant portion relative to the second outer peripheral portion): refer to "covering ratio" in FIG. 12
Volume: about 22 μF
Rated voltage: about 25 V
Base electrode layer: electrode containing conductive metal (Cu) and glass component
Plating layer: two-layer structure of Ni plated layer having a thickness of about 2 μm and Sn plated layer having a thickness of about 2 μm Next, the manufactured samples were subjected to measurement and test according to the following measurement method and test method.

(1) Measurement Method of Distances L1 and W1

First, the internal electrode and the dielectric layer located at the middle portion in the T direction of the multilayer body were peeled off by electric field peeling. Next, when the width of the internal electrode at the position ½ in the L direction of the exposed internal electrode was defined as W1, and the length in the L direction of the internal electrode at the position ½ in the W direction of the exposed internal electrode was defined as L1, W1 and L1 were measured using a digital microscope.

(2) Measurement Method of Distances L2 and W2

First, the internal electrode and the dielectric layer located at the middle portion in the T direction of the multilayer body were peeled off by electric field peeling. Next, the outermost peripheral portion adjacent to the W gap in the W direction at the position ½ in the L direction of the exposed internal electrode was observed at a magnification of 500 times using a microscope, and the resulting image was analyzed to determine the ratio of the area occupied by the internal electrode in the exposed portion. Subsequently, the measurement of the coverage was repeated while moving the observation point by about 50 μm at a time from the outermost peripheral portion toward the middle of the multilayer body (the middle in the W direction), and the distances W2 between locations where the coverage of about 1.3 times or more of the coverage of the outermost peripheral portion measured initially and the outermost peripheral portion were obtained. However, when it was not possible to confirm the increase in the coverage by about 1.3 times or more before reaching the middle portion of the multilayer body in the W direction, W2=0 was set.

Next, the outermost peripheral portion adjacent to the L gap in the L direction at the position ½ in the W direction of the exposed internal electrode was observed at a magnification of about 500 times using a microscope, and the resulting image was analyzed to determine the coverage of the internal electrode. The measurement was repeated while moving the observation point by about 50 μm at a time toward the middle in the L direction, and the distances L2 between locations where the coverage of about 1.3 times or more of the coverage of the outermost peripheral portion measured initially and the outermost peripheral portion were obtained. However, when it was not possible to confirm the increase in the coverage by about 1.3 times or more before reaching the middle portion of the multilayer body in the L direction, L2=0 was set.

(3) Method of Measuring the Coverage of the Internal Electrode Relative to the Dielectric Layer (3-1) Method of Measuring Coverage A1

The internal electrode and the dielectric layer located at the middle portion in the T direction of the multilayer body were peeled off by electric field peeling to expose the internal electrode. The location at a position ½ in the L direction and inwards W2/2 from the electrode outermost peripheral portion in the W direction, of the first outer peripheral portion defined from the measurement results of above L1, L2, W1, and W2 was observed at a magnification of 500 times using a microscope, and the resulting image was analyzed to determine the coverage A1 of the internal electrode of the first outer peripheral portion.

(3-2) Method of Measuring Coverage A2

The internal electrode and the dielectric layer located at the middle portion in the T direction of the multilayer body were peeled off by electric field peeling to expose the internal electrode. The location at a position ½ in the L direction and inwards W2/2 from the electrode outermost peripheral portion in the W direction, of the second outer peripheral portion defined from the measurement results of above L1, L2, W1, and W2 was observed at a magnification of 500 times using a microscope, and the resulting image was analyzed to determine the coverage A2 of the internal electrode of the second outer peripheral portion.

(3-3) Method of Measuring Coverage B1

The internal electrode and the dielectric layer located at the middle portion in the T direction of the multilayer body were peeled off by electric field peeling to expose the internal electrode. The location at a position ½ in the L direction and ½ in the W direction of the first inner electrode portion defined from the measurement results of above L1, L2, W1, and W2 was observed at a magnification of 500 times using a microscope, and the resulting image was analyzed to determine the coverage B1 of the first inner electrode portion.

(3-4) Method of Measuring Coverage B2

The internal electrode and the dielectric layer located at the middle portion in the T direction of the multilayer body were peeled off by electric field peeling to expose the internal electrode. The location at a position ½ in the L direction and ½ in the W direction of the second inner electrode portion defined from the measurement results of above L1, L2, W1, and W2 was observed at a magnification of 500 times using a microscope, and the resulting image was analyzed to determine the coverage B2 of the second inner electrode portion.

(4) Measurement Method of Distances L3 and W3

First, the external electrode, the first side surface-side outer layer portion, the second side surface-side outer layer portion, the first end surface-side outer layer portion, and the second end surface-side outer layer portion were scraped off by polishing, and a capacitance C1 of a single dielectric layer located at the middle portion in the T direction of the multilayer body was measured under the condition of frequency of about 1 kHz and applied voltage of about 1 Vrms using a manipulator and a C meter.

Subsequently, the outer peripheral portions of the first side surface and the second side surface were scraped off respectively by about 50 μm by polishing, a capacitance C2 of a single layer was measured under the condition of frequency of about 1 kHz and applied voltage of about 1 Vrms using a manipulator and a C meter, and the relative dielectric constants of the high dielectric constant portions of the first side surface and the second side surface were calculated by the following expression (1).

Relative dielectric constant of the high dielectric constant portion of the first side surface and the second side surface=$((C1-C2)\times$(thickness $d$ of the dielectric element))/((relative dielectric constant $\varepsilon 0$ in vacuum)$\times(2\times L1\times$one side polishing amount)$\times$(average value of the internal electrode coverages $A1$ and $A2$)) (1)

The above measurement procedure was repeated at the same location while increasing the polishing amount by about 50 μm at a time, and the one-side polishing amount when the relative dielectric constant becomes less than about 80% of the relative dielectric constant of the outermost peripheral portion measured initially was defined as W3. However, when the relative dielectric constant was not lowered to less than about 80% before reaching the middle portion in the W direction, W3=0 was set.

Subsequently, the high dielectric constant portions of the first side surface and the second side surface were scraped off respectively by about 50 μm by polishing, a capacitance C3 of a single layer was measured under the condition of frequency of about 1 kHz and applied voltage of about 1 Vrms using a manipulator and a C meter, and the relative dielectric constants of the high dielectric constant portions of the first end surface and the second end surface were calculated by the following expression (2).

Relative dielectric constant of the high dielectric constant portion of the first end surface and the second end surface=$((C1-C3)\times$(thickness $d$ of the dielectric element))/((relative dielectric constant $\varepsilon 0$ in vacuum)$\times(2\times W1\times$one side polishing amount)$\times$(average value of the internal electrode coverages $A1$ and $A2$)) (2)

The above measurement procedure was repeated at the same location while increasing the polishing amount by about 50 μm at a time, and the one-side polishing amount when the relative dielectric constant becomes less than about 80% of the relative dielectric constant of the outermost peripheral portion measured initially was defined as L3. However, when the relative dielectric constant was not lowered to less than about 80% before reaching the middle portion in the L direction, L3=0 was set.

(5) Measurement Method of the Relative Dielectric Constants A3, A4, B3, and B4 of the Dielectric First, the external electrode, the first side surface-side outer layer portion, the second side surface-side outer layer portion, the first end surface-side outer layer portion, and the second end surface-side outer layer portion were scraped off by polishing, and a capacitance C1 of a single dielectric layer located at the middle portion in the T direction of the multilayer body was measured under the condition of frequency of about 1 kHz and applied voltage of about 1 Vrms using a manipulator and a C meter.

(5-1) Calculation of Relative Dielectric Constants A3 and A4

The outer peripheral portions of the first side surface, the second side surface, the first end surface side, and the second end surface were scraped off respectively by about 50 μm, by polishing. At this time, the area of the scraped portion as viewed from the main surface was calculated by the following expression (3).

Area of scraped portion=$2\times L1\times 50$ μm+$2\times(W1-2\times 50$ μm$)\times 50$ μm (3)

Next, a capacitance C4 of a single dielectric layer located at the middle portion in the T direction was measured under the condition of frequency of about 1 kHz and applied voltage of about 1 Vrms using a manipulator and a C meter, and the relative dielectric constant A3 of the high dielectric constant portion was calculated by the following expression (4) using the coverages A1 and A2 of the internal electrode.

Relative dielectric constant $A3$ of the high dielectric constant portion=$(C1-C4)\times$(the thickness $d$ of the dielectric element))/((relative dielectric constant $\varepsilon 0$ in vacuum)$\times$(the area of the portion scraped off by polishing$\times$average value of the internal electrode coverages $A1$ and $A2$)) (4)

The relative dielectric constant A4 of the high dielectric constant portion was calculated by the same method.

(5-3) Calculation of Relative Dielectric Constants B3 and B4

The first side surface and the second side surface were subjected to polishing, and the first outer peripheral portion and the second outer peripheral portion defined by W2, and the first high dielectric constant portion and the second high dielectric constant portion defined by W3 which were measured above were scraped off completely. Furthermore, the first side surface and the second side surface were subjected to polishing, and the first outer peripheral portion and the second outer peripheral portion defined by L2, and the first high dielectric constant portion and the second high dielectric constant portion defined by L3 which were measure above were scraped off completely. The length direction and the width direction when the multilayer body after polishing was viewed from the main surface were respectively defined as L4 and W4, a capacitance C5 of a single dielectric layer located at the middle portion in the T direction was measured under the condition of frequency of about 1 kHz and applied voltage of about 1 Vrms using a manipulator and a C meter, and the relative dielectric constant B3 of the inner dielectric layer was calculated by the following expression (5) using the coverages B1 and B2 of the inner electrode portion.

Relative dielectric constant $B3$ of the inner dielectric layer=($C5$×(thickness $d$ of the dielectric element))/((relative dielectric constant $e0$ in vacuum)×($L4$×$W4$×average value of the internal electrode coverages $B1$ and $B2$))     (5)

The relative dielectric constant B4 of the high dielectric constant portion was calculated by the same method.

(6) Method of Measuring the Covering Ratio of the First High Dielectric Constant Portion Relative to the First Outer Peripheral Portion, and the Covering Ratio of the Second High Dielectric Constant Portion Relative to the Second Outer Peripheral Portion The covering ratio was calculated from the measurement results of L1, L2, L3, W1, W2, and W3, using the following expression (6).

Covering ratio=($L1$×$W1$−($L1$−$L3$)×($W1$−2×$W3$))/($L1$×$W1$−($L1$−$L2$)×($W1$−2×$W2$))×100%     (6)

(7) Measurement Method and Decision Criterion for Capacitance (Cap)

The capacitance obtained under the condition of frequency of about 1 kHz and applied voltage of about 1 Vrms was measured using a C meter. The decision criterion for the capacitance was set to be about 20.4 μF or more to fit within a capacitance deviation of about ±10% in consideration of aging (decrease in capacitance with time) for a nominal capacitance of about 22 μF.

(8) Test Method and Decision Criterion for Service Life

HALT (Highly Accelerated Life Test) was performed at a test temperature of about 150° C. and a test voltage of about 30 V, and the service life was calculated from B1 life (at the time of failure where the cumulative failure probability becomes about 1%). The decision criterion for the service life was defined as 10 years, which is the standard for consumer products, and the result of the reliability test was acceptable when the service life was determined as 10 years or more.

FIG. 12 is a table showing the results of capacitance measurement and reliability test when the covering ratio in the experimental examples is changed. The multilayer ceramic capacitors according to the samples of Examples 1 to 4 had a capacitance of about 20.4 μF or more, and the results of the reliability test were acceptable (a service life of 10 years or more). On the contrary, in the multilayer ceramic capacitors of the samples of Comparative Example 1 and Comparative Example 2, although the results of the reliability test were an acceptable determination, the capacitances were less than about 20.4 μF. Furthermore, in the multilayer ceramic capacitor according to the sample of Comparative Example 3, although the capacitance was 20.4 μF or more, the result of the reliability test was not acceptable. That is, from the present experimental examples, it was confirmed that the covering ratio of the first high dielectric constant portion 21A relative to the first outer peripheral portion 31A, and the covering ratio of the second high dielectric constant portion 22A relative to the second outer peripheral portion 32A were preferably about 68% or more and about 187% or less.

From the above results, according to the multilayer ceramic capacitor of the present preferred embodiment, it is possible to reduce or prevent a decrease in capacitance, and ensure high reliability without increasing the relative dielectric constant of the dielectric layers 20 in the entire multilayer body 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of laminated dielectric layers and a plurality of laminated internal electrodes, the multilayer body further including a first main surface and a second main surface that are opposed to each other in a height direction, a first side surface and a second side surface that are opposed to each other in a width direction perpendicular or substantially perpendicular to the height direction, and a first end surface and a second end surface that are opposed to each other in a length direction perpendicular or substantially perpendicular to the height direction and the width direction; and
    external electrodes; wherein
    the plurality of laminated dielectric layers each include a first dielectric layer and a second dielectric layer;
    the plurality of laminated internal electrodes each include a first internal electrode on the first dielectric layer and extending to the first end surface, and a second internal electrode on the second dielectric layer and extending to the second end surface;
    the external electrodes include a first external electrode connected to the first internal electrode and provided on the first end surface, and a second external electrode connected to the second internal electrode and provided on the second end surface;
    the first internal electrode includes four sides, a first outer peripheral portion in a vicinity of three sides other than one side extending to the first end surface, and a first inner electrode portion inside the first outer peripheral portion;
    the second internal electrode includes four sides, a second outer peripheral portion in a vicinity of three sides other than one side extending to the second end surface, and a second inner electrode portion provided inside the second outer peripheral portion;
    when a coverage of the first internal electrode relative to the first dielectric layer in the first outer peripheral portion is defined as A1, and a coverage of the first internal electrode relative to the first dielectric layer in the first inner electrode portion is defined as B1, a relationship of A1<B1 is satisfied;
    when a coverage of the second internal electrode relative to the second dielectric layer in the second outer peripheral portion is defined as A2, and a coverage of the second internal electrode relative to the second dielectric layer in the second inner electrode portion is defined as B2, a relationship of A2<B2 is satisfied;
    the first dielectric layer includes four sides in a region in which the first internal electrode is provided, a first high dielectric constant portion in a vicinity of three sides other than one side located at the first end surface, and a first inner dielectric layer portion located inside the first high dielectric constant portion;
    the second dielectric layer includes four sides in a region in which the second internal electrode is provided, a second high dielectric constant portion in a vicinity of three sides other than one side located at the second end surface, and a second inner dielectric layer portion located inside the second high dielectric constant portion;
    when a relative dielectric constant of the first dielectric layer in the first high dielectric constant portion is defined as A3, and a relative dielectric constant of the first dielectric layer in the first inner dielectric layer portion is defined as B3, a relationship of A3>B3 is satisfied;

when a relative dielectric constant of the second dielectric layer in the second high dielectric constant portion is defined as A4, and a relative dielectric constant of the second dielectric layer in the second inner dielectric layer portion is defined as B4, a relationship of A4>B4 is satisfied; and a covering ratio of the first high dielectric constant portion relative to the first outer peripheral portion, and a covering ratio of the second high dielectric constant portion relative to the second outer peripheral portion are about 68% or more and about 187% or less.

2. The multilayer ceramic capacitor according to claim 1, wherein a length in a length direction connecting the first end surface and the second end surface of a side, which is located in a vicinity of the second end surface, of the first outer peripheral portion is about 5% or more and about 10% or less of a length in the length direction connecting the first end surface and the second end surface of the first internal electrode.

3. The multilayer ceramic capacitor according to claim 1, wherein a length in a length direction connecting the first end surface and the second end surface of a side, which is located in a vicinity of the first end surface, of the second outer peripheral portion is about 5% or more and about 10% or less of a length in the length direction connecting the first end surface and the second end surface of the second internal electrode.

4. The multilayer ceramic capacitor according to claim 1, wherein a length in a width direction connecting the first side surface and the second side surface, of a portion in a vicinity of a side in a vicinity of the first side surface and a portion in a vicinity of a side in a vicinity of the second side surface of the first outer peripheral portion is about 5% or more and about 20% or less of a length in the width direction connecting the first side surface and the second side surface of the first internal electrode.

5. The multilayer ceramic capacitor according to claim 1, wherein a length in a width direction connecting the first side surface and the second side surface, of a portion in a vicinity of a side in a vicinity of the first side surface and a portion in a vicinity of a side in a vicinity of the second side surface of the second outer peripheral portion is about 5% or more and about 20% or less of a length in the width direction connecting the first side surface and the second side surface of the second internal electrode.

6. The multilayer ceramic capacitor according to claim 1, wherein the first dielectric layer in a portion in which the first internal electrode is located has a higher relative dielectric constant approaching a portion corresponding to the first outer peripheral portion from a middle portion of the first dielectric layer, and the second dielectric layer in a portion in which the second internal electrode is located has a higher relative dielectric constant approaching a portion corresponding to the second outer peripheral portion from a middle portion of the second dielectric layer.

7. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

8. The multilayer ceramic capacitor according to claim 7, wherein each of the plurality of dielectric layers further includes at least one of a Mn compound, an Fe compound, a Cr compound, a Co compound, or a Ni compound.

9. The multilayer ceramic capacitor according to claim 1, wherein a thickness of each of the plurality of dielectric layers is about 0.5 µm or more and about 10 µm or less.

10. The multilayer ceramic capacitor according to claim 1, wherein each of the plurality of internal electrodes includes at least one of Ni, Cu, Ag, Pd, Au, or an alloy including at least one of Ni, Cu, Ag, Pd, or Au.

11. The multilayer ceramic capacitor according to claim 1, wherein a dimension of the multilayer body in the length direction is about 0.4 mm or more and about 3.2 mm or less, a dimension of the multilayer body in the height direction is about 0.2 mm or more and about 2.5 mm or less, and a dimension of the multilayer body in the width direction is about 0.2 mm or more and about 2.5 mm or less.

12. The multilayer ceramic capacitor according to claim 1, wherein a thickness of the first outer peripheral portion is about 0.1 µm or more and about 0.5 µm or less.

13. The multilayer ceramic capacitor according to claim 1, wherein a thickness of the first inner electrode portion is about 0.3 µm or more and about 0.7 µm or less.

14. The multilayer ceramic capacitor according to claim 1, wherein a thickness of the second outer peripheral portion is about 0.1 µm or more and about 0.5 µm or less.

15. The multilayer ceramic capacitor according to claim 1, wherein a thickness of the second inner electrode portion is about 0.3 µm or more and about 0.7 µm or less.

16. The multilayer ceramic capacitor according to claim 1, wherein the relative dielectric constant A3 of the first dielectric layer in the first high dielectric constant portion relative to the relative dielectric constant B3 of the first inner dielectric layer portion is higher in the range of about 5% or more about 25% or less.

17. The multilayer ceramic capacitor according to claim 1, wherein the relative dielectric constant A3 of the first dielectric layer in the first high dielectric constant portion is preferably, for example, about 3500 or more and about 4000 or less, and the relative dielectric constant B3 of the first dielectric layer in the first inner dielectric layer portion is preferably, for example, about 3000 or more and about 3400 or less.

18. The multilayer ceramic capacitor according to claim 1, wherein the relative dielectric constant A4 of the second dielectric layer in the second high dielectric constant portion relative to the relative dielectric constant B4 of the second inner dielectric layer portion is preferably, for example, higher in the range of about 5% or more about 25% or less.

19. The multilayer ceramic capacitor according to claim 1, wherein the relative dielectric constant A4 of the dielectric layer in the second high dielectric constant portion is preferably, for example, about 3500 or more and about 4000 or less, and the relative dielectric constant B4 of the dielectric layer in the second inner dielectric layer portion is preferably, for example, about 3000 or more and about 3400 or less.

* * * * *